US012541549B1

(12) United States Patent
Betz et al.

(10) Patent No.: US 12,541,549 B1
(45) Date of Patent: Feb. 3, 2026

(54) ITERATIVE FACT-EXTRACTION

(71) Applicant: Aurea Software, Inc., Austin, TX (US)

(72) Inventors: Martin Betz, Palo Alto, CA (US); Harshal Pradhan, Thane (IN); Ankush Nagpal, Gurgaon (IN); Xiang Yu, Clarksville, MD (US)

(73) Assignee: Aurea Software, Inc., Austin, TX (US)

( * ) Notice: Subject to any disclaimer, the term of this patent is extended or adjusted under 35 U.S.C. 154(b) by 0 days.

(21) Appl. No.: 15/652,160

(22) Filed: Jul. 17, 2017

Related U.S. Application Data

(63) Continuation of application No. 12/802,202, filed on May 29, 2010, now abandoned.

(51) Int. Cl.
G06F 16/38 (2019.01)

(52) U.S. Cl.
CPC .................................. G06F 16/38 (2019.01)

(58) Field of Classification Search
None
See application file for complete search history.

(56) References Cited

U.S. PATENT DOCUMENTS

| 4,864,502 | A  | * | 9/1989 | Kucera | G06F 40/253 |
| | | | | | 704/8 |
| 6,826,553 | B1 | * | 11/2004 | DaCosta | G06F 16/9535 |
| | | | | | 715/255 |
| 7,965,891 | B2 | | 6/2011 | Handley et al. | |
| 2004/0078725 | A1 | * | 4/2004 | Little | G06F 11/2257 |
| | | | | | 714/48 |
| 2005/0108001 | A1 | * | 5/2005 | Aarskog | G06F 17/271 |
| | | | | | 704/10 |
| 2005/0108630 | A1 | * | 5/2005 | Wasson | G06F 17/241 |
| | | | | | 715/230 |
| 2006/0242180 | A1 | * | 10/2006 | Graf | G06F 16/86 |
| 2007/0179776 | A1 | * | 8/2007 | Segond | G06F 17/2247 |
| | | | | | 704/9 |
| 2007/0288247 | A1 | * | 12/2007 | Mackay | G06Q 10/00 |
| | | | | | 705/325 |

OTHER PUBLICATIONS

Bird et al., "Natural Language Processing with Python," 2009 (Year: 2009).*
Non-Final Office Action dated Feb. 15, 2017, mailed in U.S. Appl. No. 12/802,202, pp. 1-81.
Request for Continued Examination (RCE) and RCE Submission as filed in U.S. Appl. No. 12/802,202 on Dec. 5, 2016, pp. 1-16.
(Continued)

*Primary Examiner* — Yu Zhao

(57) ABSTRACT

Some embodiments provide a method for identifying a first pattern formed by a first set of document elements. The method associates a tag that identifies the first pattern with the document. The method then identifies a second pattern formed by a second set of document elements and the tag. The method associates a second tag with the document. The second tag identifies the second pattern and is associated with a fact. Some embodiments provide a graphical user interface (GUI) for manually processing tags associated with a document. Further, different embodiments provide a system for performing iterative fact-extraction on a set of documents.

10 Claims, 22 Drawing Sheets

(56) References Cited

OTHER PUBLICATIONS

Final Office Action dated Feb. 2, 2016, mailed in U.S. Appl. No. 12/802,202, pp. 1-84.
Response to Non-Final Office Action dated Jul. 24, 2015, as filed in U.S. Appl. No. 12/802,202 on Oct. 27, 2015, pp. 1-13.
Non-Final Office Action dated Jul. 24, 2015, mailed in U.S. Appl. No. 12/802,202, pp. 1-76.
Request for Continued Examination (RCE) and RCE Submission as filed in U.S. Appl. No. 12/802,202 on Jun. 11, 2015, pp. 1-15.
Final Office Action dated Mar. 10, 2015, mailed in U.S. Appl. No. 12/802,202, pp. 1-70.
Response to Non-Final Office Action dated Jul. 14, 2014, as filed in U.S. Appl. No. 12/802,202 on Nov. 12, 2014, pp. 1-13.
Non-Final Office Action dated Jul. 14, 2014, mailed in U.S. Appl. No. 12/802,202, pp. 1-63.
Applicant's Statement of the Substance of the Interview dated Mar. 12, 2013, as filed in U.S. Appl. No. 12/802,202 on Apr. 17, 2013, pp. 1-2.
Applicant-Initiated Interview Summary dated Mar. 18, 2013, mailed in U.S. Appl. No. 12/802,202, pp. 1-3.
Request for Continued Examination (RCE) and RCE Submission as filed in U.S. Appl. No. 12/802,202 on Feb. 21, 2013, pp. 1-13.
Final Office Action dated Nov. 21, 2012, mailed in U.S. Appl. No. 12/802,202, pp. 1-63.
Response to Non-Final Office Action dated Mar. 29, 2012, as filed in U.S. Appl. No. 12/802,202 on Aug. 29, 2012, pp. 1-13.
Applicant-Initiated Interview Summary dated Aug. 21, 2012, mailed in U.S. Appl. No. 12/802,202, pp. 1-5.
Non-Final Office Action dated Mar. 29, 2012, mailed in U.S. Appl. No. 12/802,202, pp. 1-50.

\* cited by examiner

ITERATIVE FACT-EXTRACTION

CLAIM OF BENEFIT TO PRIOR APPLICATION

This Application is a continuation application of U.S. patent application Ser. No. 12/802,202, filed May 29, 2010, now published as U.S. Patent Publication 2011/0295864. U.S. Patent Publication 2011/0295864 is incorporated herein by reference.

BACKGROUND

Most information today is stored electronically and is available on the World Wide Web. This information includes blog posts, articles (e.g., news articles, opinion pieces, etc.), research papers, web pages, and many other types of documents. While having this much information available is useful, it is often desirable to find information relevant to a particular topic.

Search engines exist today to find documents on the web. Most search engines use web crawlers to retrieve these documents from web sites. These retrieved documents are typically passed to an indexer that parses and generates keywords from the contents of the documents. Some existing implementations of the indexer may parse each sentence of a particular document to generate data structures known as grammatical trees to represent words and phrases of the document. These structures can then be utilized subsequently to provide responses to user queries. However, these responses are not always good and often require the users to spend quite a bit of time processing the retrieved documents to derive answers for their questions.

BRIEF SUMMARY

Some embodiments of the invention provide a novel method for extracting one or more facts from a document that contains several document elements. The method of some embodiments iteratively analyzes the document to identify facts contained in the document, which it then annotates with tags that identify the facts. In each iteration, the method of some embodiments identifies facts by (1) identifying patterns of document elements and/or tags from prior iteration(s), and (2) associating a tag with a pattern identified in the current iteration to specify the fact that is derived from the existence of the identified pattern. In other words, after each level of the multi-level fact-extraction analysis, the method of some embodiments can use the tags that the method generated in the previous level(s) of fact-extraction to identify additional patterns of documents elements and/or tags. Such additional patterns of document elements and/or tags are then tagged to indicate other facts contained in the document.

Accordingly, in some embodiments, the method associates each identified pattern of document elements and/or tags with another tag, which is, in turn, associated with a fact that can get associated with the identified pattern. In other embodiments, however, the method might not associate each tag with a fact. For instance, in some embodiments, the method identifies some tags only to use them to identify subsequent patterns that are subsequently associated with facts through other tags.

To identify patterns of document elements and/or tags, the method of some embodiments executes one or more sets of pattern analysis instructions. This method uses different pattern analysis instructions sets in different embodiments. For example, in some embodiments, the pattern analysis instructions sets define patterns as an uninterrupted sequence of document elements (e.g., a sequence of words that form an expression) or tags. In other embodiments, the pattern analysis instructions sets define patterns in terms of one or more rules that associate document elements and/or tags. Examples of such rules include rules that specify relationship between document elements and/or tags (e.g., rules the specify intersection, spacing and/or location constraints between one or more sets of words and/or tags). Yet in other embodiments, the pattern analysis instructions sets define patterns in terms of uninterrupted sequence of document elements and one or more rules that associate document elements and/or tags.

Additionally, in some embodiments, the method determines whether manual processing of the tags of the document is required. In some instances, human intervention is required to resolve issues with the extracted facts from the document. Some embodiments provide a tool for a person to manually process the document to adjust the tags of the document. Also, in some embodiments, the method provides a presentation of the facts of a particular document by processing the tags associated with several documents that it processes.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

DETAILED DESCRIPTION

In the following description, numerous details are set forth for purpose of explanation. However, one of ordinary skill in the art will realize that the invention may be practiced without the use of these specific details. For instance, some of the examples illustrate iterative fact-extraction for specific categories of facts. One of ordinary skill in the art will recognize that fact-extraction could be accomplished based on any number of categories of facts. Further, some embodiments provide perform iterative fact-extraction to a specified number of levels. Each level of iterative fact-extraction may identify additional facts. However, one of ordinary skill in the art will also realize that fact-extraction may be performed to any number of levels.

Some embodiments of the invention provide a novel method for extracting one or more facts from a document that contains several document elements. Examples of document elements include content elements (e.g., glyphs, letters, words, punctuation, numerical characters, symbols, etc.), structural elements (e.g., markup tags, headers, sections, columns, dividers, lines, etc.), and any other document elements that can be parsed in a programmatic manner. Different embodiments can examine different types and combinations of such document elements.

The method of some embodiments iteratively analyzes the document to identify facts contained in the document, which it then annotates with tags that identify the facts. In each iteration, the method of some embodiments identifies facts by (1) identifying patterns of document elements and/or tags from prior iteration(s), and (2) associating a tag with each pattern identified in the current iteration to specify the fact that is derived from the existence of the identified pattern. In other words, after each level of the multi-level fact-extraction analysis, the method of some embodiments can use the tags that the method generated in the previous level(s) of fact-extraction to identify additional patterns of documents elements and/or tags. Such additional patterns of document elements and/or tags are then tagged to indicate other facts contained in the document. Identifying subsequent patterns by using tags that specify previously identified patterns results in a more efficient fact-extraction process because this approach does not require a later analysis stage to repeat the work done by a previous analysis stage.

In some embodiments, the method associates each identified pattern of document elements and/or tags with another tag, which is, in turn, associated with a fact that can get associated with the identified pattern, as described above. However, in other embodiments, the method might not associate each tag with a fact. For instance, in some embodiments, the method identifies some tags only to use them to identify subsequent patterns that are subsequently associated with facts through other tags.

Figure 1:
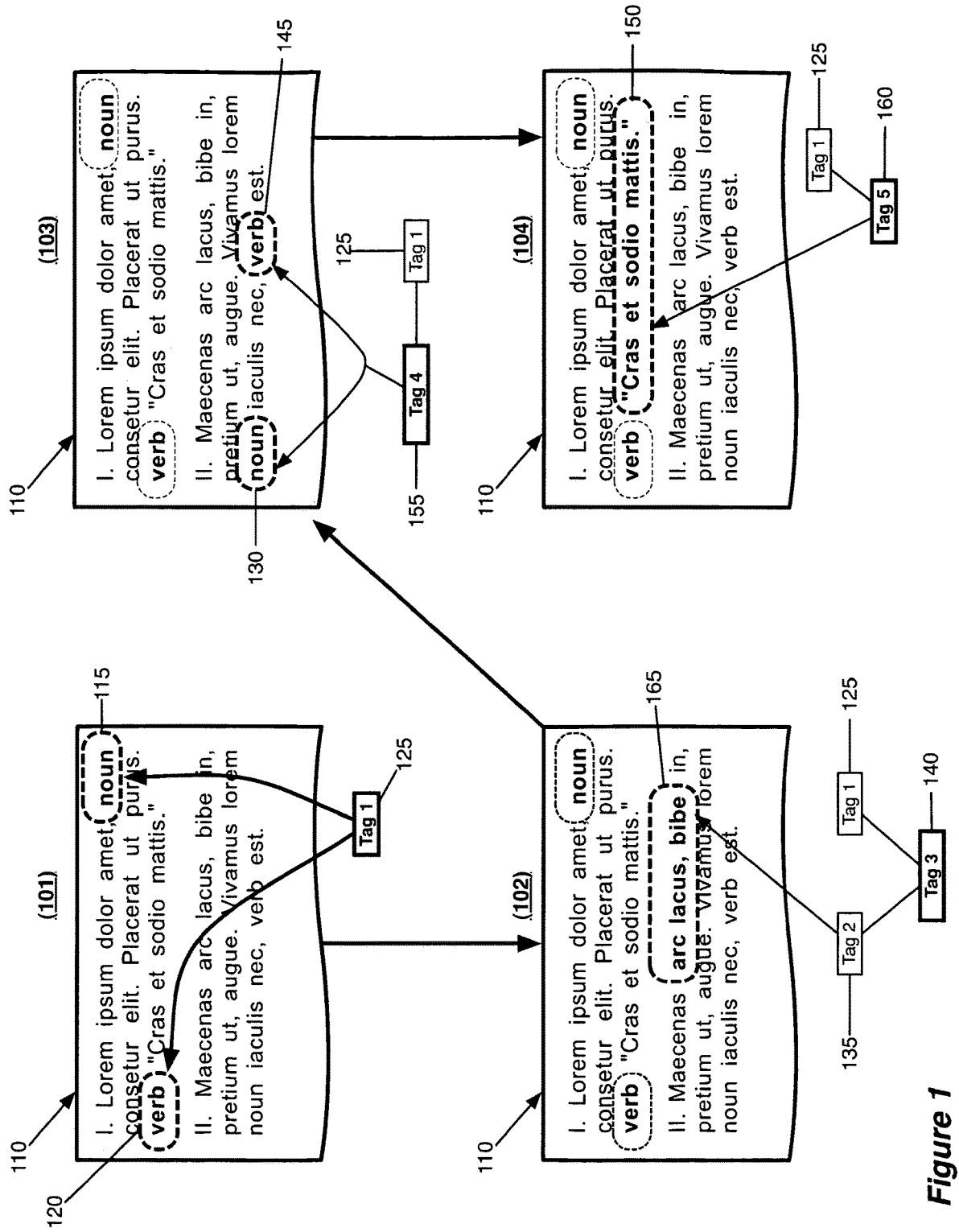
FIG. 1 conceptually illustrates an example of an iterative fact-extraction methodology of some embodiments.

FIG. 1 conceptually illustrates an example of an iterative fact-extraction method of some embodiments. In this example, the fact-extraction method analyzes one document 110 in four stages, with each of the second, third and fourth stages building on tags identified in the previous stages. To identify patterns of document elements and/or tags, the method of some embodiments executes one set of pattern analysis instructions in each stage. This method uses different pattern analysis instructions sets in different embodiments. For example, in some embodiments, the pattern analysis instructions sets define patterns as an uninterrupted sequence of document elements (e.g., a sequence of words that form an expression) or tags. In other embodiments, the pattern analysis instructions sets define patterns in terms of one or more rules that associate document elements and/or tags. Examples of such rules include rules that specify relationship between document elements and/or tags (e.g., rules the specify intersection, spacing and/or location constraints between one or more sets of words and/or tags). Yet in other embodiments, the pattern analysis instructions sets define patterns in terms of uninterrupted sequence of document elements and one or more rules that associate document elements and/or tags. For simplicity's sake, this example only illustrates words in the document 110 as the document elements that are used for each stage of the analysis.

FIG. 1 illustrates the fact-extraction analysis of the document 110 in terms of four sets of results 101-104 that correspond to the output of four stages of the analysis. The first stage result 101 shows that the first stage of the analysis identified one pattern. The identified pattern includes a certain noun 115 that has a particular relationship with a certain verb 120. In this example, the particular relationship is the proximity between the certain noun 115 and the verb 120. The first analysis stage identifies this pattern in some embodiments when executing a pattern analysis instruction. In some embodiments, this instruction is a relationship-based rule that is expressed as a conditional statement. One example of such a relationship-based rule (i.e., a proximity-based rule in this example) is:

If Type A Noun within X of Type B Verb
→Tag C {to identify the first noun/verb pattern}, where X is an integer, Type A Noun is a list of certain nouns (e.g., a list of the names of certain companies), Type B Verb is a list of certain verbs (e.g., certain actions verbs), and Tag C is a tag that is associated with the identified pattern. One example of such a noun/verb pattern might be a noun that is a company name followed by an action verb: hired, employed, joined, started, etc. This noun/verb pattern would possibly indicate that a particular company has hired a new employee.

Figure 2:
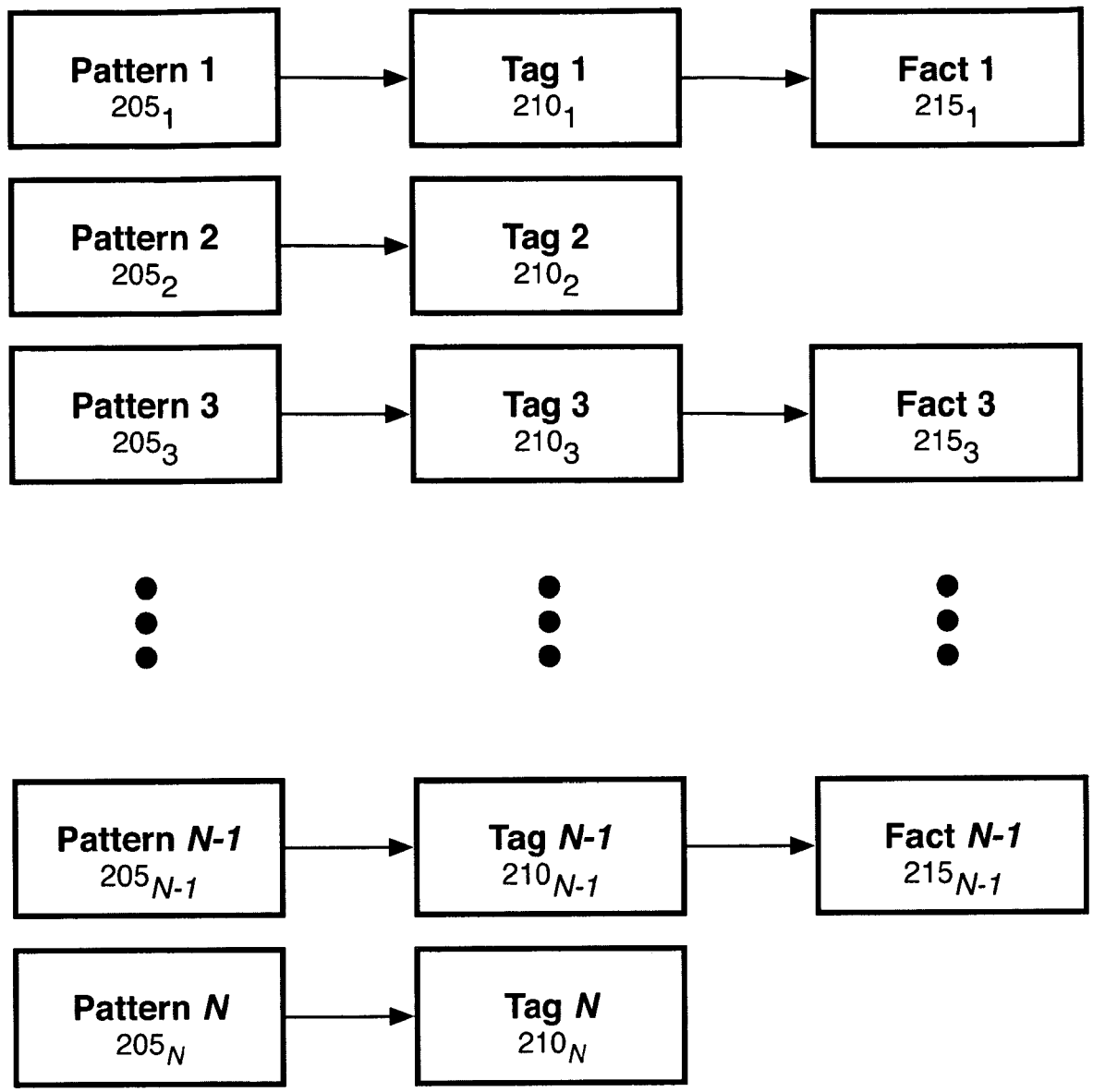
FIG. 2 illustrates the association of each pattern with a tag, which, in turn, is associated with a fact.

In some embodiments, the method not only associates each identifiable pattern with a tag but also associates each tag with a fact that possibly exists in the document. FIG. 2 illustrates the association of each pattern 205 with a tag 210, which, in turn, is associated with a fact 215. As shown FIG. 2, some embodiments do not associate a fact with each tag in each level of pattern analysis. As further described below, some embodiments do not associate facts with the earlier stage tags. Also, as further described below, the facts that are derived in some embodiments are the tags that are defined in the later stages of the analysis. In other words, these embodiments do not specify an association between tags and facts, but instead utilize the later stage tags to express facts that can be reported, presented and/or queried.

In the example illustrated in FIG. 1, the first stage result 101 associates the identified noun/verb pattern with a tag 125 that has an associated fact. For instance, in the new hiring example mentioned above, the tag 125 would be a "New Hire" tag that would be associated with a fact: "New employee hiring by a company."

The second stage result 102 shows that the second stage of the analysis identified two patterns. In the second stage, the first identified pattern is a multi-word expression 165, while the second identified pattern is formed by the first stage tag 125 having a relationship with (i.e., in this example, being within a certain proximity of) the multi-word expression. The second analysis stage identifies these patterns in some embodiments when executing a pattern analysis instruction, which in some of these embodiments is formulated as:

If find Type D Expression,
 Then If Type D Expression within Q of Tag C→
  Tag E {to identify Type A Expression},
  Tag F {to identify Type A Expression with Q of Tag C}, where Q is an integer, Type D Expression is a list of certain words, multi-word combinations or acronyms (e.g., a list of the job titles), Tag E is a tag that is associated with the identified expression, and Tag F is a tag associated with the pattern formed by the identified expression having a relationship with (i.e., in this example, being within a certain proximity of) the noun/verb pattern identified in the first stage. Tag types E and F appear as tags 135 and 140 in the second stage result 102. Using the first stage tag 125 to identify the second stage tag 140 allows the fact-extraction method to operate more efficiently by allowing the second stage analysis to build on the first stage analysis (i.e., to not repeat the first stage analysis).

For the new hiring example mentioned above, the expression could be a multi-word titular expression such as Chief Executive Officer, Vice President, Chief Operating Officer, etc., while the tag/expression pattern could be a titular expression having a relationship with (i.e., in this example, being within a certain proximity of) a New Hire tag. Accordingly, for this new hire example, the tag 135 would associate a job title with the identified titular expression pattern. The tag 140, in turn, could be a "New Hire Title" tag 140 that could be a title (in this case, the identified multi-word expression) associated with the New Hire tag.

The third stage result 103 shows that the third stage of the analysis identifies another pattern. This pattern includes a certain noun 130 having a relationship with (e.g., in this example, being within a certain proximity of) a certain verb 145, with this noun/verb combination within a particular proximity. The third analysis stage identifies this pattern in some embodiments when executing a pattern analysis instruction, which in some of these embodiments is formulated as:

If Type G Noun within Y of Type H Verb,
 Then If Type G Noun or Type H Verb within W of Tag C→
  Tag I {to identify noun/verb pattern}, where Y is an integer, Type G Noun is a list of certain nouns (e.g., a list of the names of certain companies), Type H Verb is a list of certain verbs (e.g., certain actions verbs), and Tag I is a tag that is associated with the identified pattern of the newly identified noun/verb combination that has a relationship between (e.g., within certain proximity) the first tag C, which is associated with the first noun/verb pattern. In the third stage, Tag I appears as tag 155.

For the new hiring example mentioned above, the second noun/verb pattern identified in the third stage could be a noun that is a company name followed by an action verb, such as fired, left, resigned, quit, etc. This noun/verb pattern would possibly indicate that a particular person has left a particular company. When this second noun/verb pattern is within the first noun/verb pattern identified in the first stage (where this first pattern identifies a company hiring a new employee), this relationship (e.g., proximity) might specify the previous employer for a newly hired person. To annotate this potential fact, the third stage result 103 (1) uses a "Previous Company" tag as the tag 155, and (2) stores with this tag a reference to the noun from the identified second noun/verb pattern, in order to identify the name of the previous company.

The fourth stage result 104 shows that the fourth stage of the analysis identifies yet another pattern. This pattern includes a quote 150 having a relationship with (i.e., in this example, within a certain proximity of) the tag 125 that represented the first identified noun/verb pattern. The fourth analysis stage identifies this pattern in some embodiments when executing a pattern analysis instruction, which in some of these embodiments is formulated as:

If Type J Quote within Z of Tag C
 →Tag K {to identify quote within proximity of first noun/verb pattern}, where Z is an integer, Type J Quote is one of the quote type from a list of quote types (e.g., single quotes, double quotes, block quotes, nested quotes), and Tag K is a tag that is associated with the identified pattern of the newly identified quote within certain proximity of the first tag C, which is associated with the first noun/verb pattern. In the third stage, Tag K appears as tag 160.

For the new hiring example mentioned above, the quote identified in the fourth stage could possibly be a quote about the hiring of the new employee when this quote has a relationship with (i.e., in this example, is within a certain proximity of) the first noun/verb pattern identified in the first stage (where this first pattern identifies a company hiring a new employee). Accordingly, to annotate this potential fact, the fourth stage result 104 (1) uses a "New Hire Quote" tag as the tag 160, and (2) stores with this tag a reference to a portion or the entirety of this quote. This reference can be specified in a variety of ways, such as in terms of the start and end locations of the quote or quote portion, or in terms of the start or end location plus or minus a certain number of words, or in terms of a location within the quote or document from which the rest of the portion or the quote can be identified, etc.

One of ordinary skill will realize that the fact-extraction process that is described above by reference to FIG. 1 is only one example of how some embodiments perform fact-extraction. Other embodiments might perform such processes differently. For instance, while the example illustrated in FIG. 1 is described by reference to four stages of analysis, other fact-extraction processes of other embodiments might have fewer or additional stages. Moreover, other embodiments might generate tags and associate these tags with the document, document elements, and/or other tags differently. For example, as mentioned above, the third stage of the fact-extraction process of FIG. 1 creates one tag when it identifies a second noun/verb pattern and then identifies the relationship (e.g., the proximity) of this pattern with respect to the first tag 125. Other embodiments, however, might first create and associate a tag with the second noun/verb pattern identified in the third stage, and then in another stage identify the relationship (e.g., proximity) of this new tag to the first tag 125.

Several more detailed embodiments are described in the sections below. Section I provides a conceptual description of the multi-level iterative fact-extraction process. Next, Section II conceptually describes example structures of documents and tags. Section III provides conceptual descriptions of example patterns that the iterative fact-extraction process can identify in a document. Section IV provides a description of a tool for manually processing the tags of a document to adjust the results of iterative fact processing. Section V describes examples of various graphical user interfaces for presenting the output of the iterative fact-extraction process. Next, Section VI provides a description for an architecture of a system that performs the iterative fact-extraction process. Section VII describes an electronic system that implements the iterative fact-extraction process.

I. Exemplary Fact-Extraction Process

Figure 3:
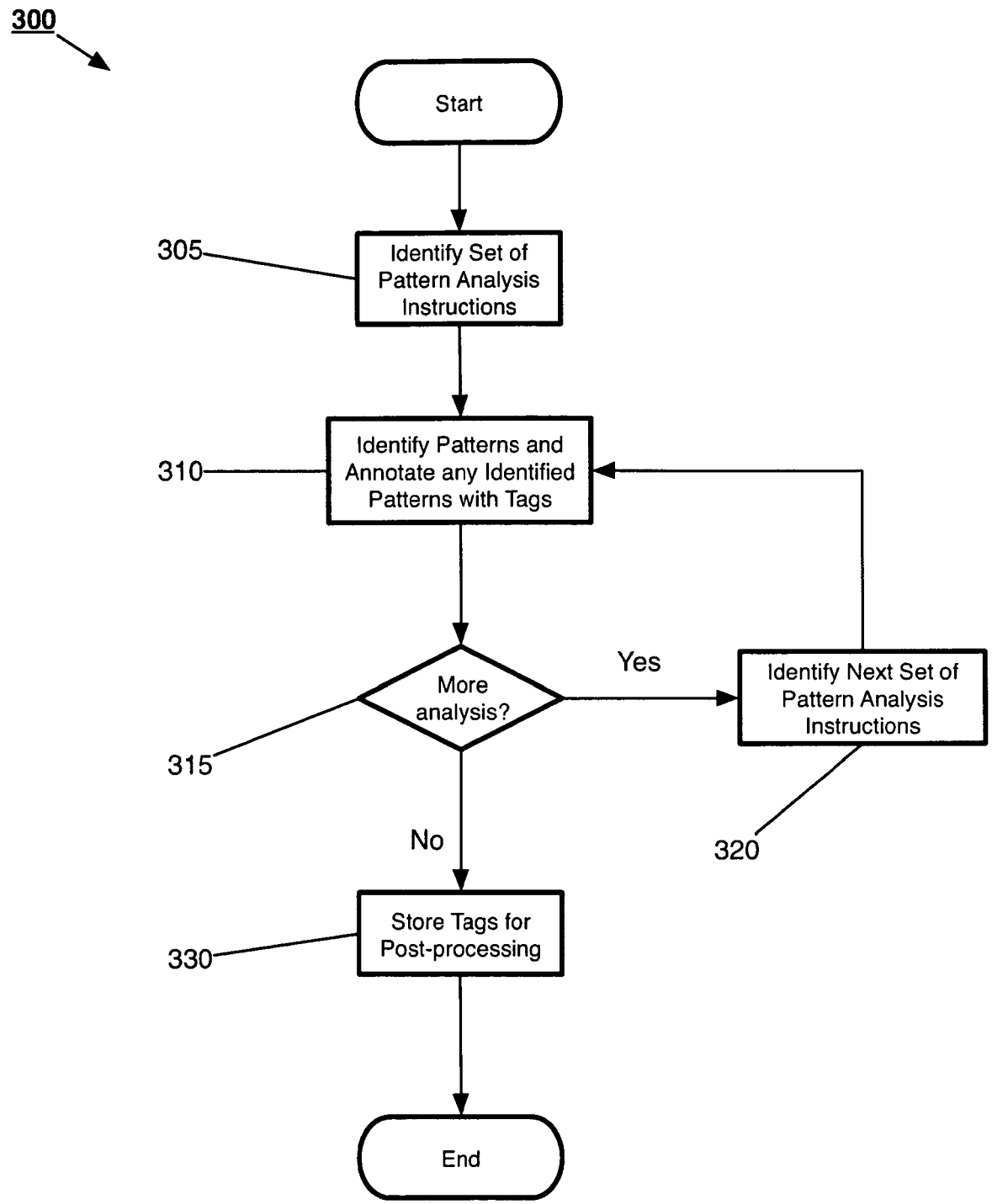
FIG. 3 conceptually illustrates an iterative fact-extraction process of some embodiments.

FIG. 3 conceptually illustrates an iterative pattern analysis process 300 of some embodiments. In each iteration, this process analyzes the document to identify, and to annotate with tags, patterns of (1) document elements that are contained in the document and/or (2) annotated tags that are previously associated with the document in any previous iteration. In some embodiments, some or all of the annotated tags are associated with facts. Through this association, facts can be extracted from the document. The process 300 will be explained below by reference to FIG. 4, which conceptually illustrates multiple levels of analysis 410 that are performed on a document 405 based on a group of pattern analysis instructions 415.

The process 300 is performed each time one document needs to be analyzed to extract facts from it. Some embodiments perform this process on each document in a group of documents that is retrieved from a network (e.g., a local area network, a wide area network, etc.) or network of networks (e.g., the Internet) by a document retriever that retrieves documents (e.g., HTML documents, PDF documents, word processed documents-such as Word documents, Word Perfect documents, etc.) on a periodic or continuous basis. A web crawler is an example of such a document retriever. Some embodiments perform this process for each document when batch processing several documents. Other embodiments perform this process on each document in a real-time basis as each document is received or retrieved. Also, when a document does not have document elements or sufficient number of document elements in the desired format for the pattern-identification analysis of the process 300, some embodiments attempt to change the document's format into a format that has the desired document elements or desired number of document elements. For instance, when the document is a PDF document that is not specified in terms of alphanumeric characters or symbols, some embodiments perform optical character recognition (OCR) analysis to produce alphanumeric characters or symbols in the document.

As shown in FIG. 3, the process initially identifies (at 305) one set of pattern analysis instructions for identifying patterns in the document. The process then executes (at 310) the identified pattern analysis instruction set. The execution of such a set may cause the process to identify one or more patterns of document elements. For each pattern that it identifies at 310, the process (at 310) creates a tag and associates the tag with the pattern. In some embodiments, a tag respectively can be associated with a fact. Hence, each pattern identified at 310 can be associated with a fact through its associated tag.

However, while the process 300 in some embodiments associates each identified pattern with a tag that is associated with a fact, the process 300 in other embodiments does not associate each identified pattern with a tag that is associated with a fact. For instance, in some embodiments, the process 300 does not associate facts with all tags, or does not associate facts with tags from the earlier analysis stages (e.g., with tags from the first analysis stage 310). Accordingly, in some embodiments, not all the patterns identified by the process 300 are necessarily associated with facts through their tags. In these embodiments, the process 300 identifies some tags only to use them to identify subsequent patterns that are associated with facts through their tags.

Figure 4:
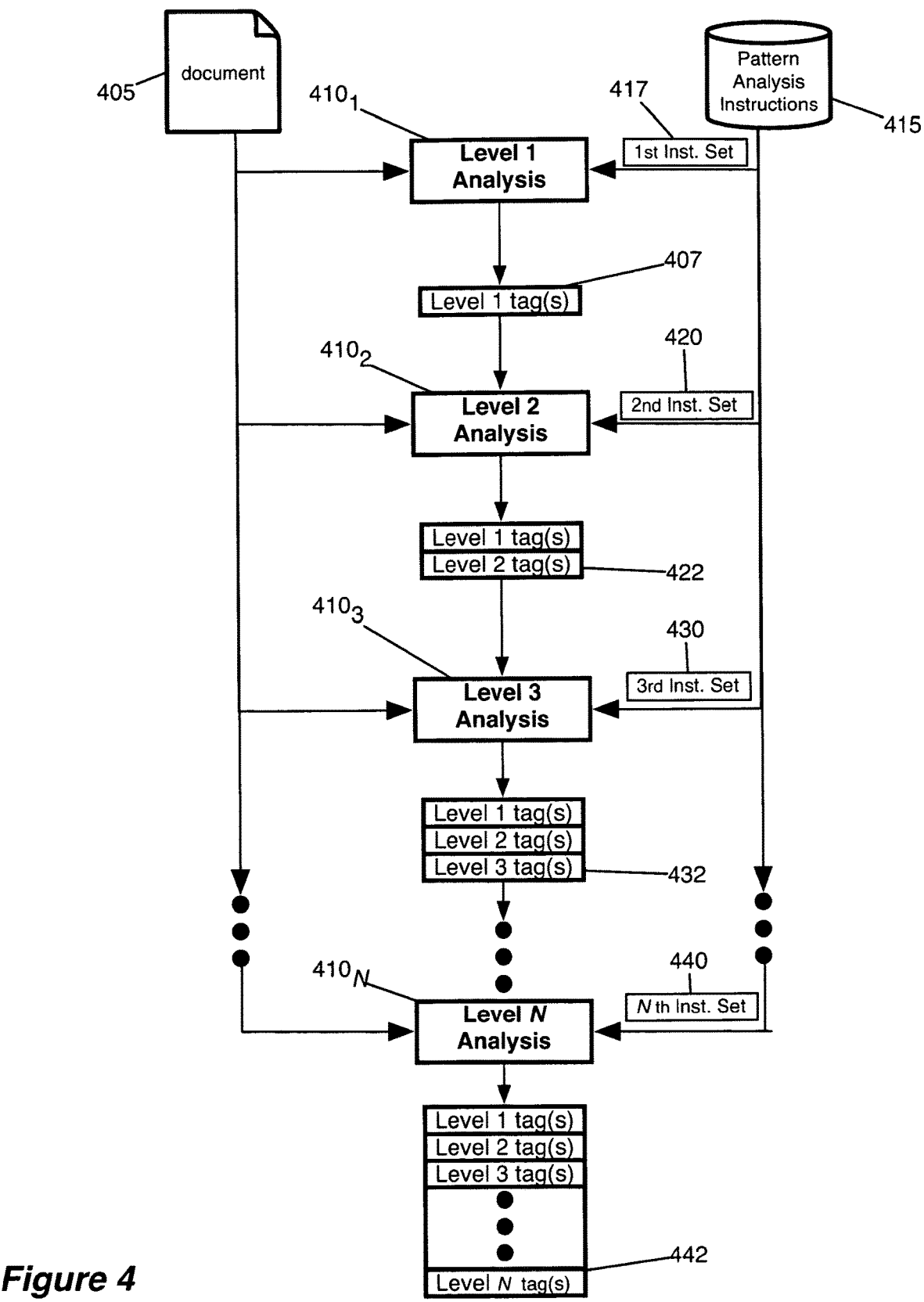
FIG. 4 illustrates a conceptual block-diagram view of a multi-level fact-extraction process.

FIG. 4 illustrates an example of a first level analysis $410_1$ that is performed on a document 405 at 310. As shown in this figure, this first analysis level executes a first set of pattern analysis instructions 417 on the document 405. This execution results in a first set of tags 407 that are associated with a first set of patterns identified by the process 300 at 310. Thus, the output of the level one analysis $410_1$ includes a tag set 407 that indicates an extracted set of facts in the document 405.

After 310, the process 300 then determines (at 315) whether more pattern analysis is to be performed on the document, as shown in FIG. 3. When the process determines (at 315) that it needs to perform additional pattern analysis, it transitions to 320 to perform another level of pattern analysis. At 320, the process identifies another set of pattern analysis instructions to execute.

From 320, the process then transitions back to 310, where it executes the pattern analysis instruction set identified at 320. In some embodiments, the pattern analysis instruction sets after the first pattern analysis instruction set can define patterns of document elements and/or tags identified in prior pattern analysis levels. Accordingly, the execution (at 310) of the instruction set identified at 320 may cause the process 300 to identify one or more patterns of document elements and/or tags. For each pattern that it identifies at 310, the process (at 310) creates a tag and associates the tag with the pattern. As mentioned above, some embodiments associate each tag with a fact, while other embodiments do not associate each tag with a fact. When a tag is associated with a fact, the tag associates this fact with the pattern that the tag annotates.

FIG. 4 illustrates an example of a second level analysis $410_2$ that is performed on the document 405 at 310. As shown in this figure, this second analysis level executes a second set of pattern analysis instructions 420 on the document 405. This execution results in a second set of tags 422 that are associated with a second set of patterns of document elements and/or tags that is identified by the process 300 at 310. Thus, the output of the level two analysis 410$_2$ includes tag set 422 that indicates an additional fact set extracted in the document 405.

After 310, the process again determines (at 315) whether more pattern analysis is to be performed on the document, as shown in FIG. 3. If so, the process repeats operations 320 and 310 for each additional set of pattern analysis instructions that it needs to execute. In the example illustrated in FIG. 4, the process 300 performs N−2 additional pattern analysis iterations 410$_3$-410$_N$, after performing the first two iterations of analysis. In each of these additional levels of analysis, the process executes another pattern analysis instruction set (e.g., instruction set 430 and instruction set 440) that results in another set of tags (e.g., tag set 432 and tag set 442). Each of these tag sets, in turn, includes one or more tags that can be used in subsequent levels of analysis and that can be associated with one or more facts.

Once the process 300 determines (at 315) that it does not need to perform any additional pattern analysis operation, the process stores (at 330) the tags generated at 310 through multiple levels of analysis. A separate process can then later analyze the stored tags to extract facts associated with the tags. After 330, the process 300 ends.

Figure 5:
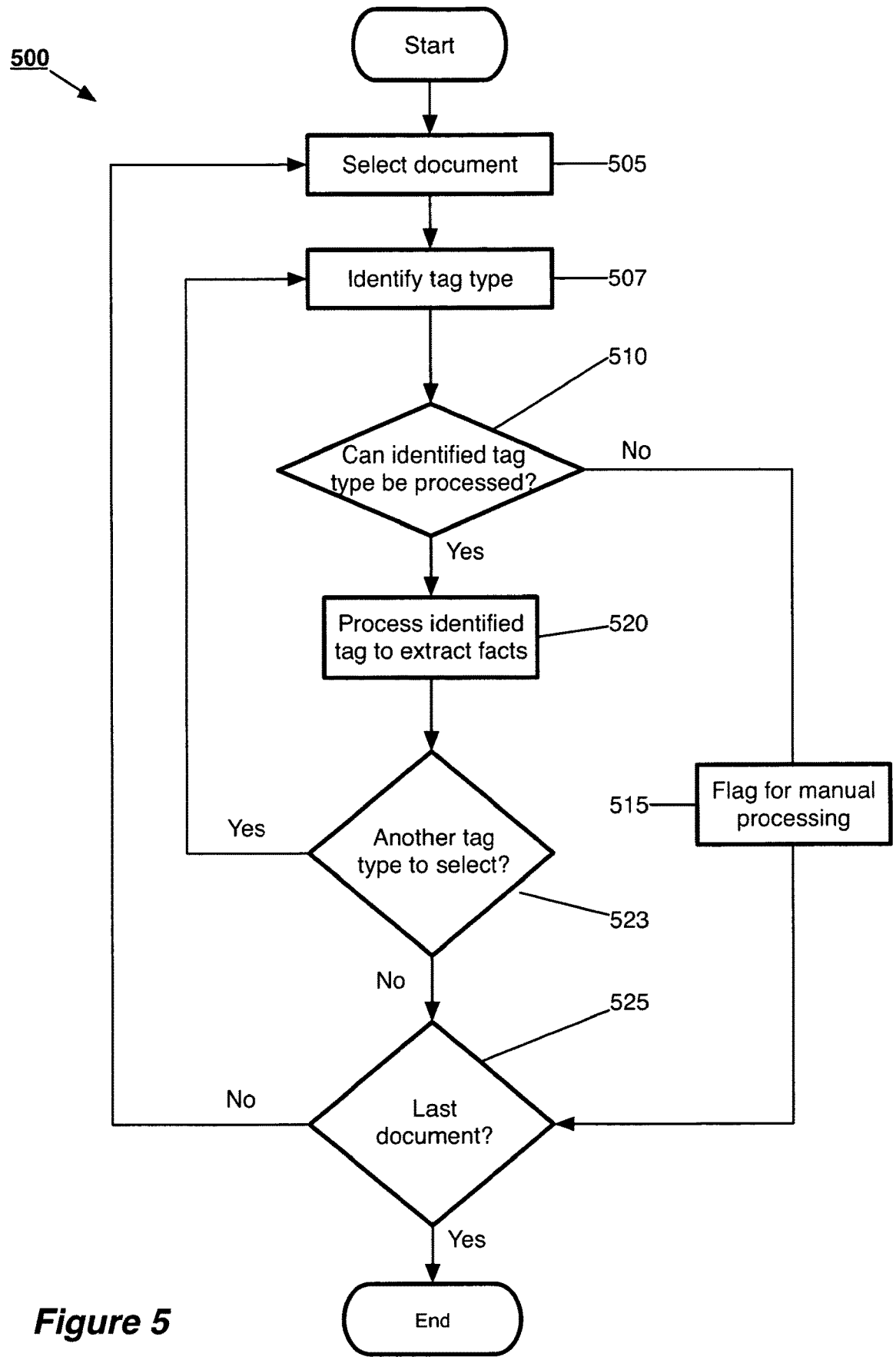
FIG. 5 conceptually illustrates a fact-extraction process that processes a series of tags that are generated by performing the iterative fact-extraction process multiple times for multiple documents in order to extract and store facts associated with these tags.

FIG. 5 conceptually illustrates a fact-extraction process 500 that processes a series of tags that are generated by performing the process 300 multiple times for multiple documents in order to extract and store facts associated with these tags. Some embodiments perform the process 500 periodically for a collection of documents that are annotated with a collection of tags.

As shown in FIG. 5, the process 500 initially selects (at 505) a document from the collection of documents. The process then identifies (at 507) a tag type of a tag associated with the document. The process then determines (at 510) whether the identified tag type can be processed.

When the process 500 determines (at 510) that the identified tag cannot be processed, the process flags (at 515) the document for manual processing. In some embodiments, a document is flagged for manual processing when it is determined during the analysis of the document that some aspect of the analysis might not be accurate. For instance, in some instances, a set of tags associated with a document does not accurately identify the facts in the document. Such could be the case when the fact-extraction process erroneously annotates the document with certain tags due to unforeseen combinations of document elements that cause an error in the pattern analysis. An example of the fact-extraction process erroneously annotating the document is when a company is instead tagged as a person (e.g., "Charles Schwab"). In another example, the fact-extraction process fails to identify a pattern of document elements that indicates a particular fact in the document. For example, the fact-extraction process could fail to identify a particular pattern for a person because the person's name is not recognized (e.g., an Indian name) as a pattern. Additionally, when a certain number of tags is associated with a set of identified patterns to derive a set of particular facts from the document, but the number of tags do not meet this requisite number, the document can be flagged as requiring manual processing.

For the manual processing of the document, some embodiments provide a tool for modifying the tags associated with the document. In this fashion, a human operator (e.g., a user) can use the tool to manually modify the tags so that the tags are more accurately associated with the facts in the document. The tool, in some embodiments, then marks the document as processed or validated by a human operator. One example of such a tool will be further described below by reference to FIG. 17. After flagging the document for manual processing, the process 500 transitions to 525, which will be further described below.

Alternatively, when the process 500 determines (at 510) that the identified tag type can be processed, the process 500 then processes (at 520) the set of tags associated with the identified tag type to extract a set of facts associated with these tags. In some embodiments, the sets of tags are implemented as a set of tag objects that are converted to a set of fact objects. This set of fact objects is populated with the data from the tag objects. Moreover, while processing tag objects of a particular type, the process can search for other previously specified tags that it can examine to retrieve facts to populate the attributes of the set of fact objects it creates for the particular set of tag objects.

The extracted facts (e.g., fact objects) can be stored to represent the extracted facts associated with the selected document. Accordingly, the process stores the extracted facts in a storage that can later be queried with or without the documents. In some embodiments, the storage that contains the extracted facts is the same storage that contains the documents and tags, while in other embodiments different storages are used to store the documents, tags, and/or facts. After 520, the process 500 then transitions to 523.

The process 500 determines (at 523) whether the identified tag type is the last tag type that it has to analyze for the selected document. When the process 500 determines (at 523) that the identified tag type is not the last tag type, the process 500 returns to 507 to select another tag type for processing and then repeats the subsequent operations for this document in order to process each tag type associated with the selected document.

Alternatively, when the process 500 determines that the identified tag type is the last tag type that it has to analyze for the selected document, the process 500 transitions to 525. The process 500 determines (at 525) whether the selected document is the last document from the collection of documents. When the process 500 determines (at 525) that the document is not the last document from the collection of documents, the process 500 returns to 505 to select another document for processing and then repeats the subsequent operations for this document in order to process it. The process 500 ends when it determines that the last document has been processed.

One of ordinary skill will realize that other embodiments perform pattern analysis and fact extraction differently that the approach described above by reference to the pattern analysis process 300 of FIG. 3 and the fact extraction process 500 of FIG. 5. For instance, some embodiments extract the pattern analysis and fact extraction processes into one process that is performed individually for each document. In some such embodiments, the tags that are identified in the earlier stages are only used to identify in later stages subsequent patterns and tags, which are then used to extract facts. Also, in some of these embodiments, the facts that are derived in the later stages are simply tags that are identified based on patterns that are detected from the earlier stage tags. Accordingly, some of these embodiments do not specify an association between tags and facts, but instead utilize the later stage tags to express facts that can be reported, presented and/or queried. In some of these other embodiments, some of these later stage tags are expressed in a manner that is optimized for subsequent querying or reporting. However, other embodiments still convert some of these later stage tags into a fact-specific format that is optimized for subsequent querying and reporting.

In the sections below, examples of patterns that the iterative fact-extraction process can identify have been described in connection with FIGS. 8-16. However, before describing the example patterns, a description of the structure of a particular document and tags is given.

II. Structure of Documents and Tags

A. Example Structure of a Document

In some embodiments, the process of iterative fact-extraction examines documents for document elements that include, but are not limited to, characters, expressions, phrases, symbols, markup tags and other structural elements. To illustrate this further, FIG. 6 conceptually illustrates an example document 610 that has been analyzed in multiple iterations in order to extract a fact about management turnover.

In some embodiments, the document 610 is characterized as a web document that includes markup tags (e.g., 605) that denote particular sections of the document. In some embodiments, each markup tag could be from markup languages such as Hypertext Markup Language (HTML), Extensible Markup Language (XML), Extensible Hypertext Markup Language (XHTML), and LaTeX.

The document 610 includes numerous document elements. In different embodiments, the document elements of the document 610 are defined differently. For instance, some embodiments define the document elements of this document as alphanumeric characters, symbols and markup tags, while other embodiments, define the document elements of the document 610 as alphanumeric character strings (which can be words), symbols and markup tags.

Figure 6:
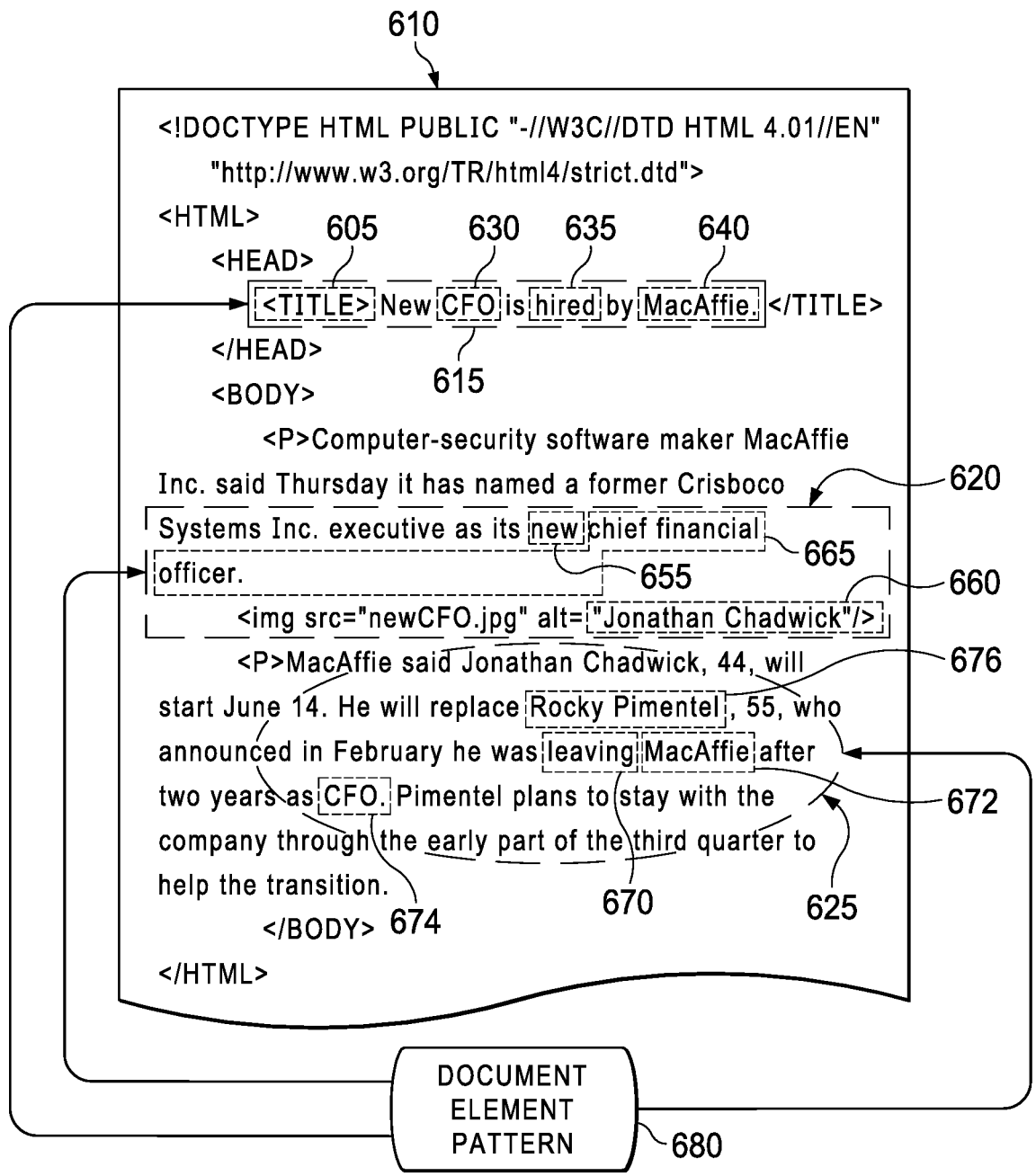
FIG. 6 conceptually illustrates an example document that has been analyzed in multiple iterations in order to extract a fact about management turnover.

FIG. 6 illustrates three patterns 615-625 that have been identified in order to extract several facts relating to a management turnover. In some embodiments, a pattern analysis process has identified these and other patterns in several pattern analysis iterations. As described above, the pattern analysis process of some embodiments, in each iteration, analyzes the document to identify, and to annotate with tags, patterns of document elements and/or annotated tags that are previously associated with the document in any previous iteration. In FIG. 6, the tags that are used to annotate the patterns are not illustrated. Instead, only the identified patterns are circled to simplify the presentation of this example.

When the document elements of the document 610 are characters and markup tags, the pattern analysis process of some embodiments first identifies patterns of character strings that form words. In some embodiments, this process then searches the document to see if it contains a title field, and if so, whether this field includes words relating to management turnover in a company. In this example, the document 610 includes a title tag 605 that specifies the title field. This title field includes three words that the process identifies as words (specified by word tags that identify recognized character strings) relating to management turnover. These words are CFO 630, hired 635, and MacAffie 640.

Once the process identifies the management turnover words in the title field of the document, the process in some embodiments examines the document further to identify additional management turnover facts. In this example, two additional management turnover facts are extracted. One fact relates to the name of the newly hired CFO, while the other fact relates to the name of the previous CFO. The first fact is identified by identifying the pattern formed by word "new" 655, the name "Jonathan Chadwick" 660, and the title "chief financial officer" 665 being within a certain proximity of each other. The second fact is identified by identifying the pattern formed by the words "leaving" 670 and "MacAffie" 672, "CFO" 674 and name "Rocky Pementel" 676 being within a certain proximity of each other. The pattern extracted from the title field and the two patterns extracted from the body of the document can then be grouped as a part of a larger pattern 680. This larger pattern can then be used to represent several facts extracted from the document 610 regarding a management turnover.

B. Example Structure of Tags

Figure 7:
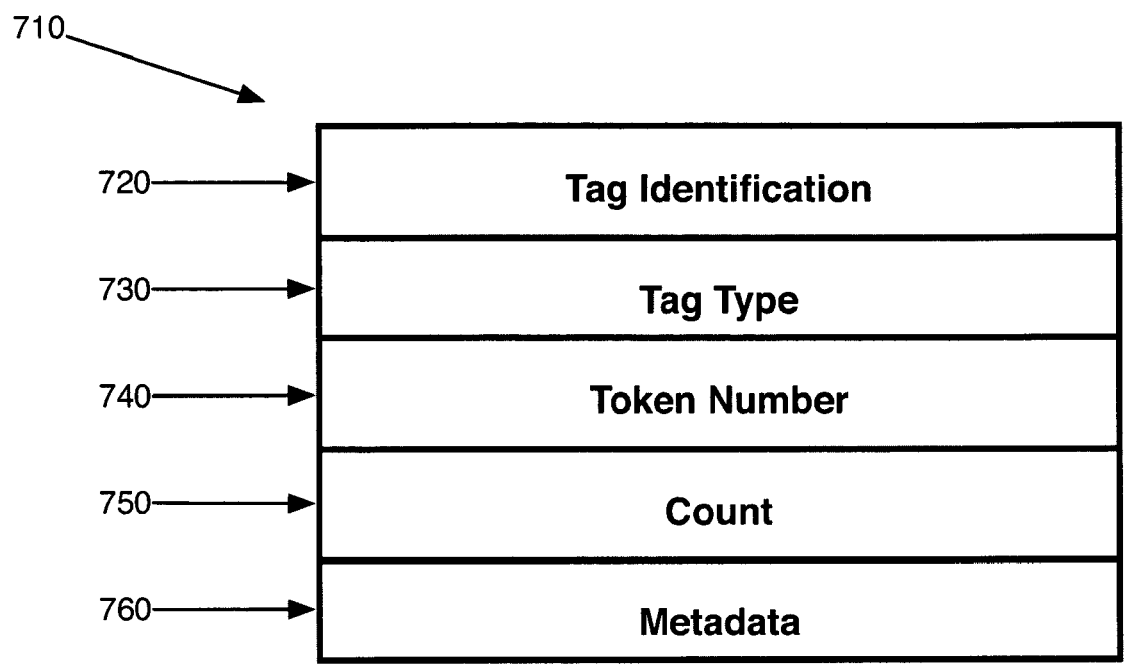
FIG. 7 conceptually illustrates an example data structure of a tag created by the fact-extraction process.

As described above, the iterative fact-extraction process of some embodiments creates tags to identify patterns of document elements and/or tags in the document. FIG. 7 conceptually illustrates an example data structure of a tag data structure 710 for a tag that is created by the fact-extraction process. This tag structure is a "non-token" tag for some embodiments that utilize token and non-token tags. A token tag in some of these embodiments is a tag that is initially assigned to each recognizable character string (e.g., each recognizable word or punctuation) in the document. In some embodiments, the earliest or one of the earliest stages of the pattern analysis iterations identifies the token tags, while the later stages of the pattern analysis define non-token tags by reference to token tags. In other words, non-token tags in some embodiments are tags that are defined in later stages by reference to token tags.

As illustrated in FIG. 7, the tag 710 includes a tag identifier 720, a tag type 730, a token number 740, a count field 750 and metadata 760. The tag identifier 720 uniquely identifies the tag amongst the other tags. The tag type 730 represents a type of tag corresponding to an identified pattern. For example, the tag type can be, but not limited to, person, company, joining verb, quote, descriptive phrase, location, title, etc.

The token number 740 represents the position of the tag in terms of a first token tag that it overlaps in the document. The count field 750 represents the length of the tag in terms of the number of token it overlaps, where the length is an integer value greater than or equal to one. For instance, if the tag's token number is 50 and its count field is 5, that means that the tag starts at the location of the $50^{th}$ token and ends at the location of the $55^{th}$ token.

The metadata 760 represents metadata that describes additional contextual and/or factual information related to the tag type. In some embodiments, the metadata reflects further qualifications on the tag type. For example, the metadata can be information related to a gender of a person, an ethnic origin of a name, a nationality of a person, and/or a role.

In other words, different types of metadata can be included with particular tag types in some embodiments. For example, a set of tag types corresponding to a person "Ursula Jones", a gender pronoun "she", a descriptive phrase "an active city council member", a quote "This is an exciting opportunity" and a title "Chairwoman" can include different metadata represented by the following examples: person (gender=female), gender pronoun (backreference=Ursula Jones), descriptive phrase (backreference=Ursula Jones), quote (speaker=Ursula Jones); title (gender=female).

Other embodiments define tag structures differently. For instance, some embodiments do not define one set of tags in terms of another set of tags (e.g., do not define non-token tags in terms non-token tags). Still other embodiments define building tag types other than token tags. For instance, some embodiments define sentence tags, which are used to define token tags that, in turn, are used to define non-token tags. Instead of defining sentence and/or token tags, some embodiments utilize elements that are native in the document as the building blocks for defining tags (e.g., for defining the location of the tags).

III. Exemplary Patterns

The following description provides several additional conceptual examples of patterns that are identified by the fact-extraction process of some embodiments. In some embodiments, this process identifies these patterns in several pattern analysis iterations. As described above, the pattern analysis process of some embodiments, in each iteration, analyzes the document to identify, and to annotate with tags, patterns of document elements and/or annotated tags that are previously associated with the document in any previous iteration.

In the examples below, not all the tags that are used to annotate the patterns are illustrated. Instead, for some of the identified patterns, only the pattern is encircled in order to simplify the presentation of this example. Also, in these examples, the identified patterns are patterns that are built with words or multi-word sequences. To identify these words and sequences, some embodiments perform pattern analysis operations that precede the stages illustrated in the examples, and these earlier stages identify and tag character strings or sequence of words to represent these words and sequences. These earlier analysis operations are not described in the earlier examples in order to avoid unneeded complexity in the describing the examples. Lastly, to simplify the examples below, the patterns described below are defined by reference to "elements." These elements can be document elements (e.g., words, etc.) native to the document in some embodiments, tags (specifying earlier identified patterns) in other embodiments, or both in yet other embodiments.

A. Back-Referencing of Patterns

In some embodiments, the fact-extraction process correlates identified patterns formed from document elements and/or tags with other identified patterns. For example, the process can correlate a gender pronoun (e.g., "he" or "she") with a person to determine the gender of the person. The correlation between patterns creates a relationship between the patterns.

Figure 8:
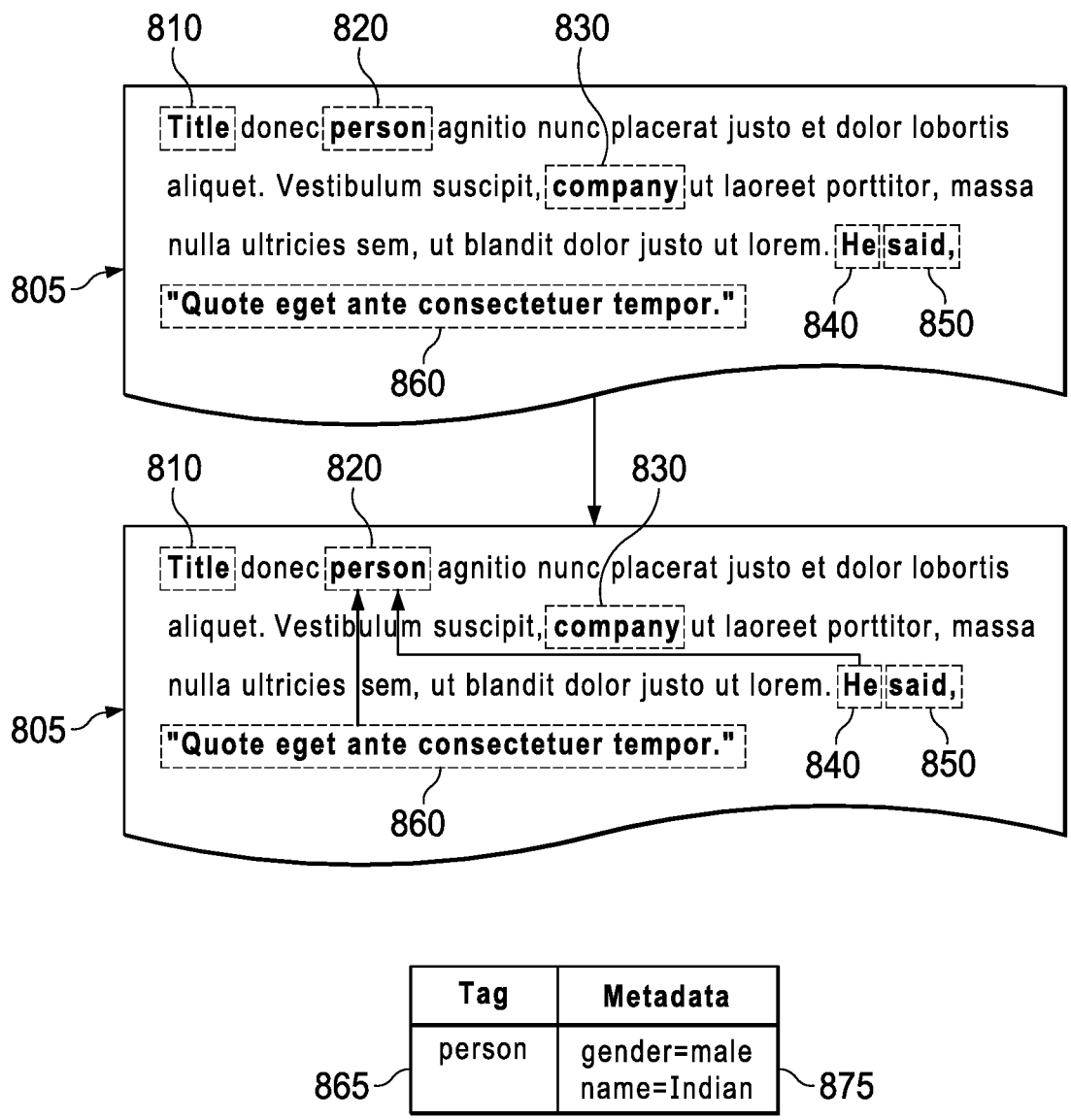
FIG. 8 conceptually illustrates examples of back-referenced patterns in a particular document and a corresponding tag of some embodiments.

FIG. 8 conceptually illustrates examples of back-referenced patterns in a particular document and a corresponding tag of some embodiments. Document 805 includes identified patterns as highlighted elements 810-860. For example, as shown in FIG. 8, an element 840 corresponds to a gender pronoun "He" and an element 820 corresponds to a person. Element 820, in some embodiments, includes a proper full name, proper first name or proper last name.

In some embodiments, the fact-extraction process determines a back-reference for the gender pronoun by searching the document 805 for the first instance of a proper name. The fact-extraction process initially searches for the proper name starting from the beginning of a sentence including the gender pronoun and continues until reaching the end of that sentence. In a case where the proper name is not found, the process determines the location of the previous sentence from the current one and searches from the start to the end of that sentence. The fact-extraction process continues to search for the proper name in this fashion (e.g., from the start to end of each previous sentence from the gender pronoun) until the proper name is located.

The fact-extraction process will then correlate the gender pronoun to the first instance of the proper name that is found. As shown in this example, the process back-references the element 840 (i.e., gender pronoun) to element 820 (i.e., person) to create a relationship between the proper name and the pronoun. In some embodiments, the process confirms that element 820 is a person from a relationship (e.g., the proximity) between element 810 (title) to element 820 (person) when the name of the person is ambiguous. After back-referencing the gender pronoun to the person, the process can further annotate a respective tag associated with the person to include contextual information or metadata for the tag.

In some embodiments, the gender of person can be determined by the relationship between title element 810 and person element 820. In a case where the title is a known word and/or expression of a gender specific title, the proximity of the title to the person confirms that the person is of that gender derived from the title. For example, in an example where the title is "Chairwoman," the person within a certain proximity of the title is of the gender (i.e., female) derived from the title.

The process of some embodiments then annotates a tag 865 corresponding to element 820 (person) with metadata 875 to describe the gender of the person. The process can determine the gender of person by using the back-referenced gender pronoun to the person. The tag 865 can also be annotated with other metadata from this determined gender information. The ethnic origin of the person can be determined from the gender information for example. In a case where the gender is male, the process can determine the ethnic origin of the person's name by using a list of known male names of a particular ethnic origin (e.g., male Indian, Spanish or English names, etc.) The process then annotates tag 865 with further metadata 875 describing the origin of the person's name.

Although the above example describes back-referencing the gender pronoun to the person, in some embodiments, the process can also correlate a person of a known gender to a gender pronoun. In a case where the gender of the person is known (e.g., the name of the person is determined to be a known male or female name), the fact-extraction process searches from the position of the person to locate the first instance of the gender pronoun matching the gender of the name. After locating the matching gender pronoun, the process then correlates the gender pronoun to the person to create a relationship between the person and the pronoun. The tag 865 is then annotated to describe the gender of the person in a similar manner as described above.

B. Quote Attribution

Figure 9A:
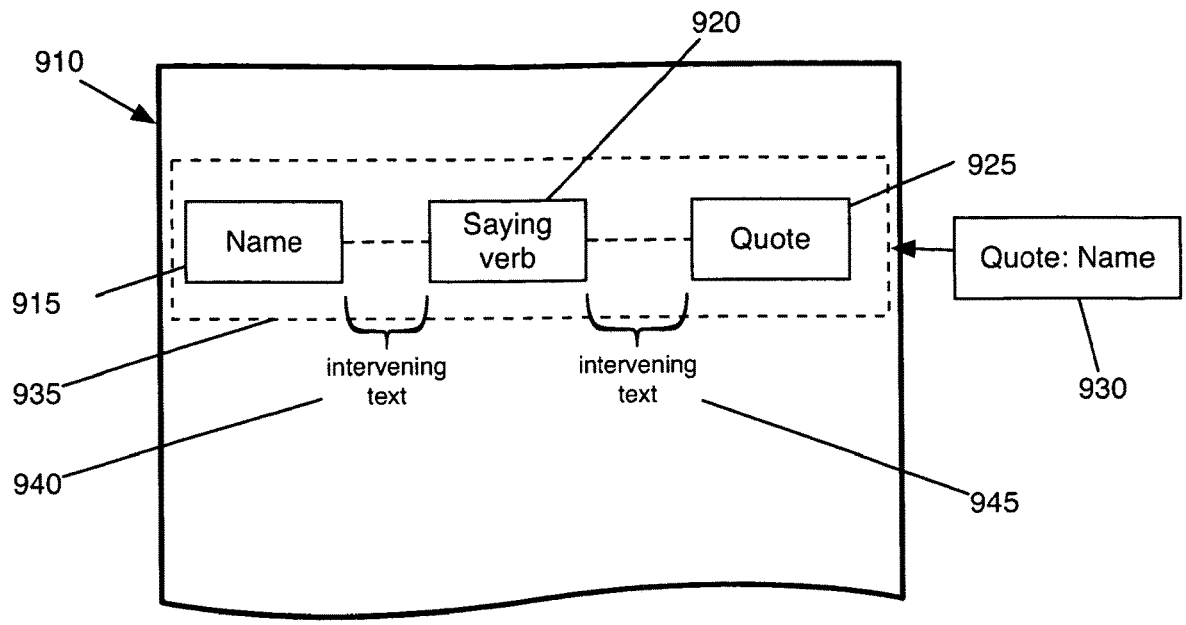
FIGS. 9(a)-(b) conceptually illustrate example patterns for attributing a name to a quote of some embodiments.
Figure 9B:
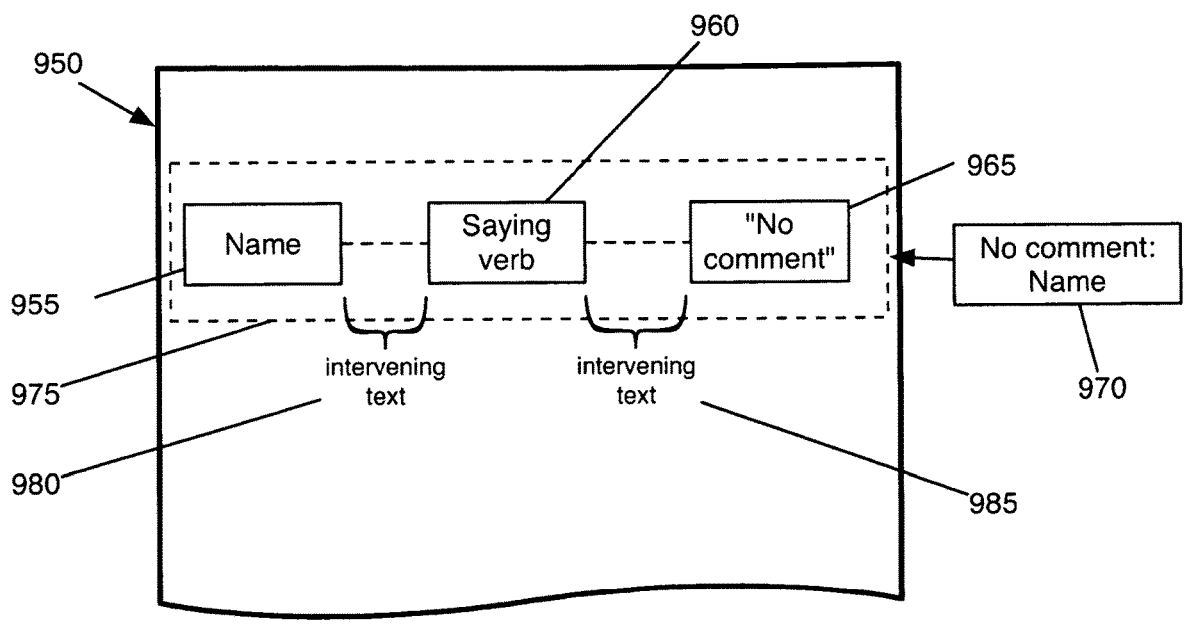

FIGS. 9(a)-(b) conceptually illustrate example patterns for attributing a name to a quote of some embodiments. In some embodiments, the iterative fact-extraction process attributes a name to a quote during a second level of pattern analysis. For example, during a first level of pattern analysis, the process identifies patterns for names and quotes in a particular document. During the second level of pattern analysis, the process attributes the name to the quote after determining the presence of intervening text between the name and quote. By attributing the name to the quote, the process can identify the speaker of the quote.

In the example, the pattern for quote attribution is formed when the intervening text includes another identified element (e.g., a "saying" verb) that is between previously identified patterns of elements (e.g., the name and quote). In this manner, the process attributes the name to the quote using a combination of previously identified patterns and an identified pattern of elements (e.g., the intervening text including the "saying" verb) in the current iteration of fact-extraction.

As illustrated in FIG. 9(a), document 910 includes element 915 corresponding to a name, element 920 corresponding to a "saying" verb, element 925 corresponding to a quote, and a pattern 935. The pattern 935 is formed from a combination of elements 915, 920 and 925. In some embodiments, the identified "saying" verb of element 920 includes a verb that indicates that a particular person provided spoken commentary (e.g., a remark that expresses a statement or opinion). Examples of "saying" verbs include, but are not limited to, forms of the words "say," "state," "express," "declare," etc. In some embodiments, the "saying" verb is identified using a list including known "saying" verbs.

In some embodiments, the process identifies the pattern 935 by determining that element 920 ("saying" verb) is positioned between elements 915 (name) and 925 (quote). In particular, pattern 935 requires that element 920 is positioned with intervening texts 940 and 945 between elements 915 and 925. The combination of elements 915, 920 and 925 forms a pattern 935 that indicates that the name of a person of element 915 said the quote of element 925. Therefore, as illustrated in FIG. 9, the fact-extraction process then annotates the pattern 935 with tag 930 to attribute the quote to the name in document 910.

The process, in some embodiments, can attribute special types of quotes to a person. To illustrate this scenario, FIG. 9(*b*) conceptually illustrates a document including a "no comment" quote (e.g., where a person states, "No comment") stated by a person is also attributed to the person identified in the document. Attribution of a "no comment" quote in document 950 is accomplished in a similar fashion as described above in connection with document 910. In some embodiments, document 950 includes elements 955 (name), 960 ("saying" verb) and 965 ("no comment" quote) and pattern 975. The pattern 975 is formed from the combination of elements 955, 960 and 965. To identify pattern 975, the iterative fact-extraction method identifies the presence of the "saying" verb in element 960 with intervening texts 980 and 985 in between elements 955 and 965. In some embodiments, the fact-extraction method annotates the pattern 975 with tag 970 to attribute the "no comment" comment to the name of the person.

Moreover, the process can attribute a name to a quote by back-referencing the name to the quote in the document. Referring back to FIG. 8, in some embodiments, the process back-references a quote to a person to attribute the quote to the person. For example, the process back-references the quote to the person by scanning document 805 to identify the first instance of the person in the document. As shown in FIG. 8, an element 860 corresponding to the quote is back-referenced to the element 820 corresponding to the person in this manner. In addition, the process can further confirm that element 820 (person) is the speaker of the quote from the relationship (e.g., proximity) between element 850 ("speaking" verb) with the previously described back-referenced element 840 (gender pronoun) and element 820 (person).

Figure 10:
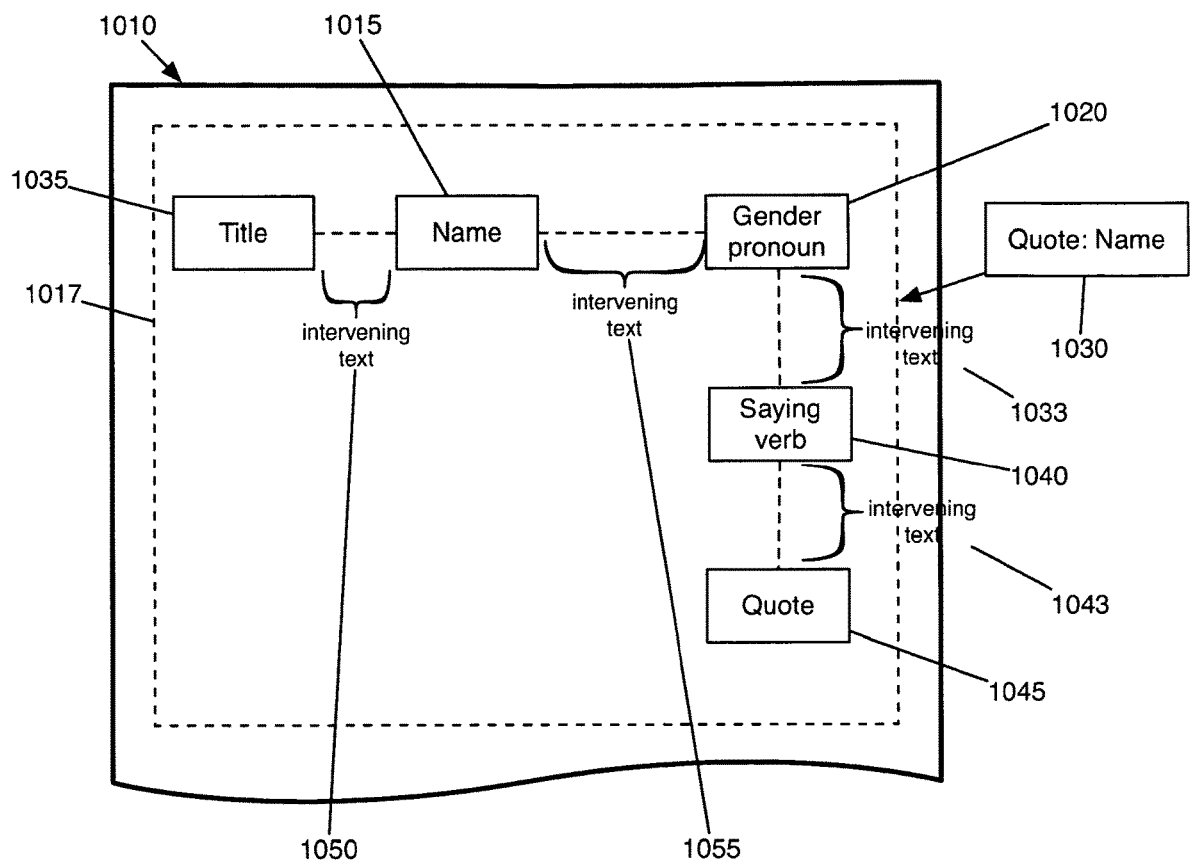
FIG. 10 conceptually illustrates an example pattern for attributing a name to quote of some embodiments.

FIG. 10 conceptually illustrates an additional example pattern for attributing a name to a quote of some embodiments. This example differs from the above quote attribution pattern examples in that additional elements corresponding to a title and gender pronoun are included in a document. As shown in this example, document 1010 include elements 1035 (title), 1015 (name), 1020 (gender pronoun), 1040 ("saying" verb), 1045 (quote) and pattern 1017.

Pattern 1017 is formed from a combination the elements 1035 (title), 1015 (name), 1020 (gender pronoun), 1040 ("saying" verb) and 1045 (quote). In this example, the relationship (e.g., proximity) between the elements 1045 (quote) and 1040 (saying verb) and intervening texts 1043 and 1033 to element 1020 (gender pronoun) indicates that name corresponding to the element 1015 is the speaker of the quote. Moreover, the gender pronoun can be correlated to the name to further confirm the speaker of the quote. In some embodiments, the fact-extraction process can correlate the gender pronoun to the name by back-referencing the gender pronoun to the name (e.g., person) as described above in FIG. 8. Therefore, to attribute the quote to the name of the person in the document, pattern 1017 requires a relationship (e.g., proximity) between element 1015 (name) to the respective elements for the gender pronoun, the saying verb, the quote and any intervening text.

In some cases, the iterative fact-extraction process uses a title to identify a name in the document where the name is ambiguous (e.g., when the name is not detected solely based on itself because of its particular ethnic origin). In this example, the process can confirm that the name is the speaker of the quote because pattern 1017 includes the title and intervening text 1050 having a relationship (e.g., proximity) with the name. Further, in some embodiments, the presence of element 1020 (gender pronoun) and intervening text 1055 between element 1015 (name) in pattern 1017 allows the gender pronoun to be back-referenced with the name in the document as described above in connection with FIG. 8. The process can use the back-referenced gender pronoun with the name to determine that name is the speaker of the quote.

The process then annotates the pattern 1017 with tag 1030 to attribute the quote to the name in document 1010. In this manner, the document is annotated with an attribution that describes the name of the person that said the quote in document 1010.

C. Management Turnover

In some embodiments, the iterative fact-extraction process identifies patterns for management turnover to track the addition or attrition of employees at a particular company. This can be useful in instances where a company wishes to research the change of personnel for a particular competitor.

Figure 11:
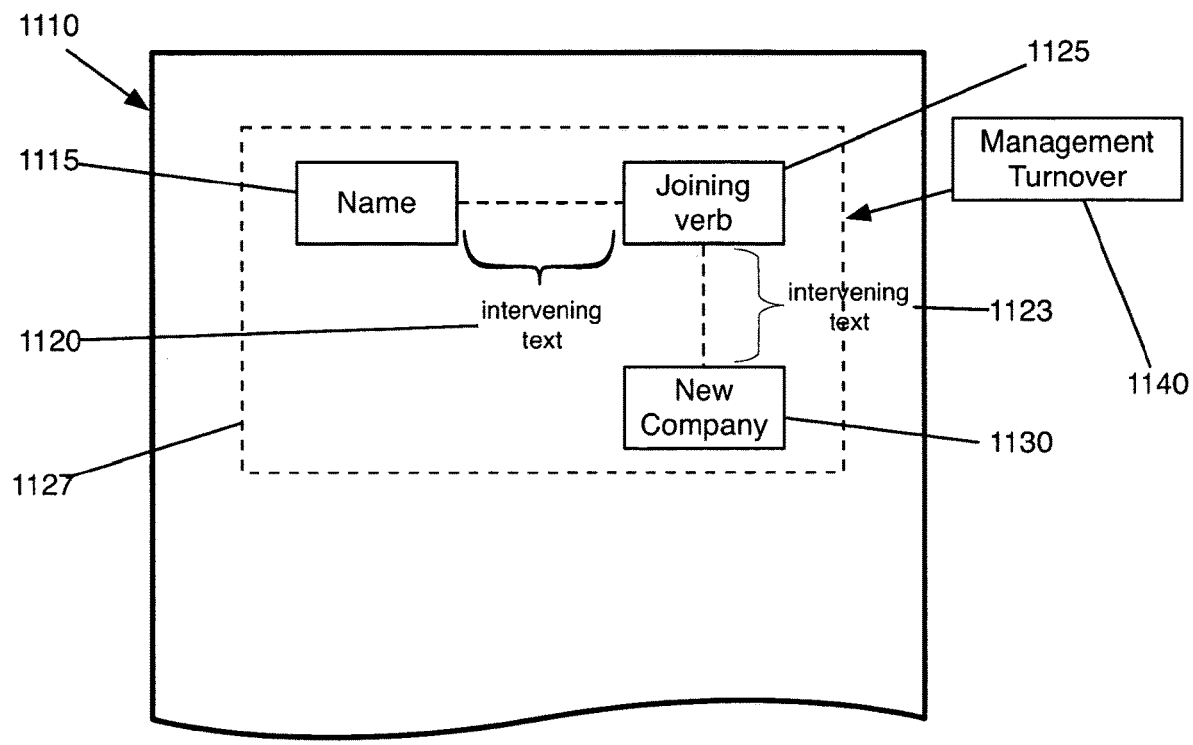
FIG. 11 conceptually illustrates an example pattern of management turnover of some embodiments FIGS. 12(a)-(b) conceptually illustrate other example patterns of management turnover of some embodiments.

FIG. 11 conceptually illustrates example patterns of management turnover in documents of some embodiments. Document 1110 includes a pattern 1127 that is formed from a combination of elements 1115, 1125, 1130 and intervening texts 1120 and 1123. Element 1125 is a "joining" verb that includes, but is not limited to, forms of the words "hire," "join," "take," etc. Element 1130 is a company. The iterative fact-extraction process identifies the pattern 1127 in document 1110 to determine that management turnover has occurred for a particular company. The process then annotates the pattern 1127 with tag 1140 to indicate management turnover.

Figure 12A:
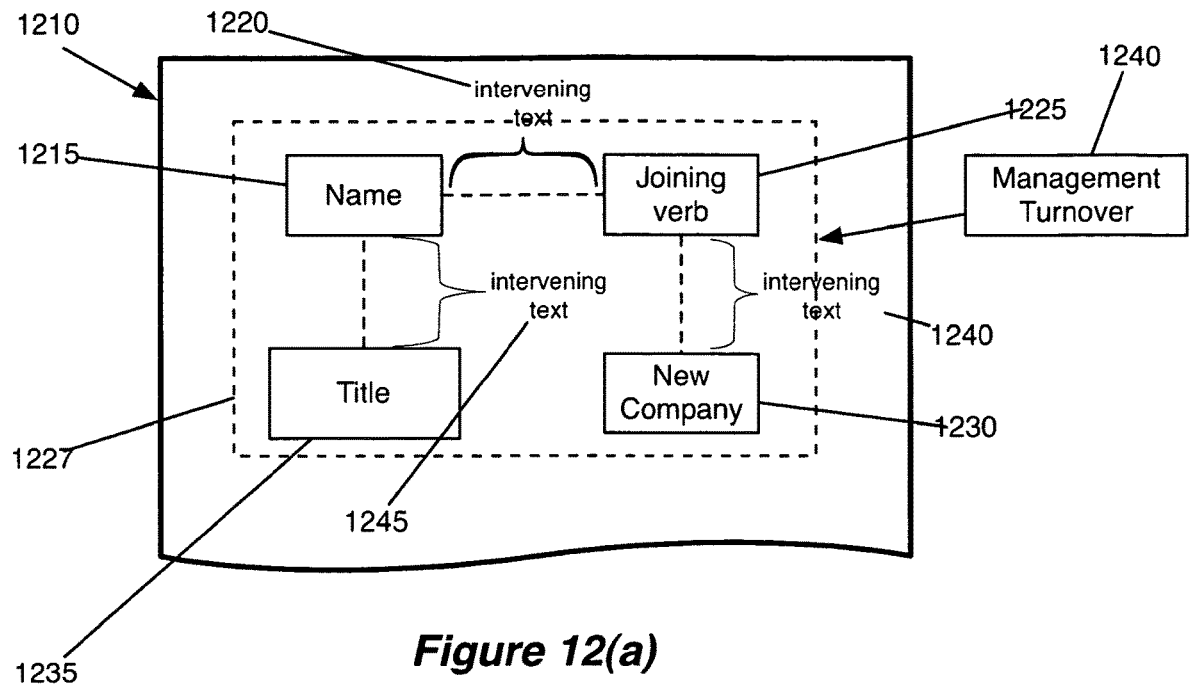
Figure 12B:
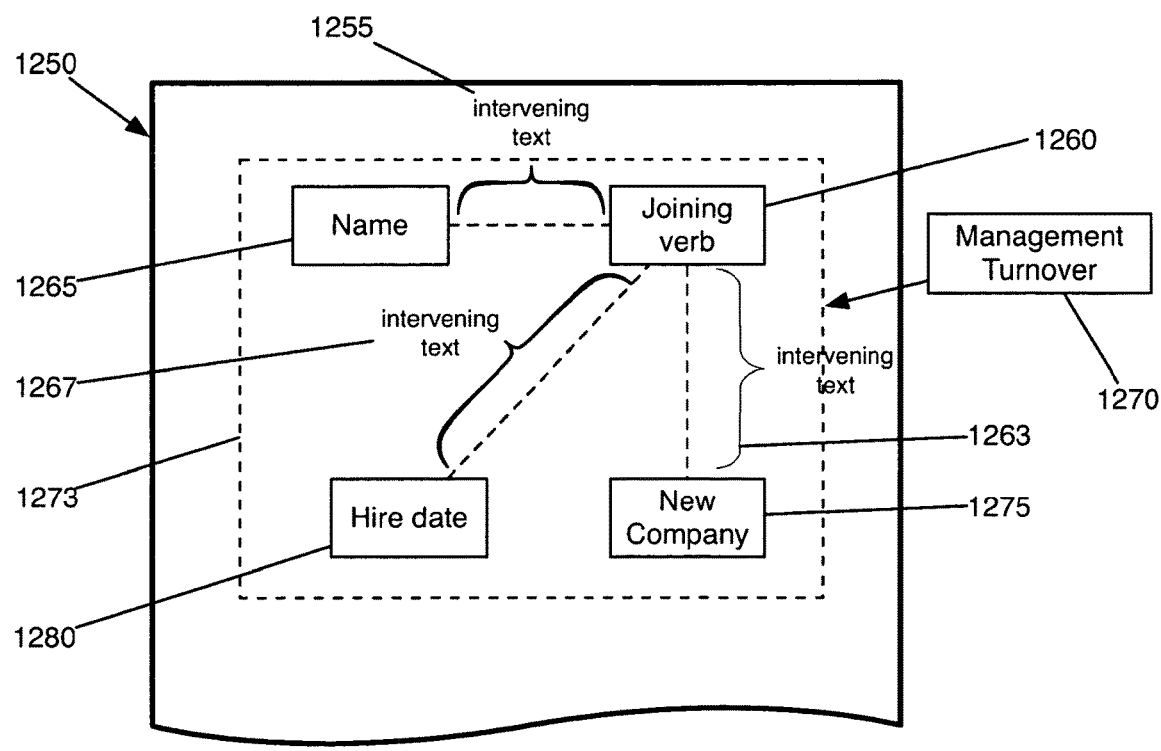

FIG. 12(*a*)-(*b*) conceptually illustrate other example patterns of management turnover in documents of some embodiments. Similar to the above described document 1110 of FIG. 11, management turnover is conceptually illustrated in FIG. 12(*a*) by elements related to a title or hire date in a particular document. In some embodiments, document 1210 includes a pattern 1227 formed from combination of elements 1215 (name), 1225 (joining verb), 1230 (company), 1235 (title) and intervening texts 1240 and 1245. In some embodiments, element 1235 (title) and intervening text 1237 having a relationship (e.g., proximity) between elements 1215 (name), 1225 (joining verb) and 1230 (company) indicates management turnover for document 1210. The iterative fact-extraction process then annotates pattern 1227 with tag 1240 to indicate management turnover.

Moreover, management turnover is also indicated by a hire date. The hire date may be identified by elements including words or expressions that include a combination of days, months and/or numbers (e.g., "1/1/2010", "January 1, 2010", etc.). In some embodiments, document 1250 includes a pattern 1273 formed from elements 1265 (name), 1260 (joining verb), 1275 (company), 1280 (hire date) and intervening texts 1255, 1267 and 1263. The presence of a hire date of element 1280 and intervening text 1267 between the "joining" verb of element 1260 indicates management turnover in some embodiments. In some embodiments, the iterative fact-extraction process annotates pattern 1273 with tag 1270 to indicate management turnover in the document.

Figure 13:
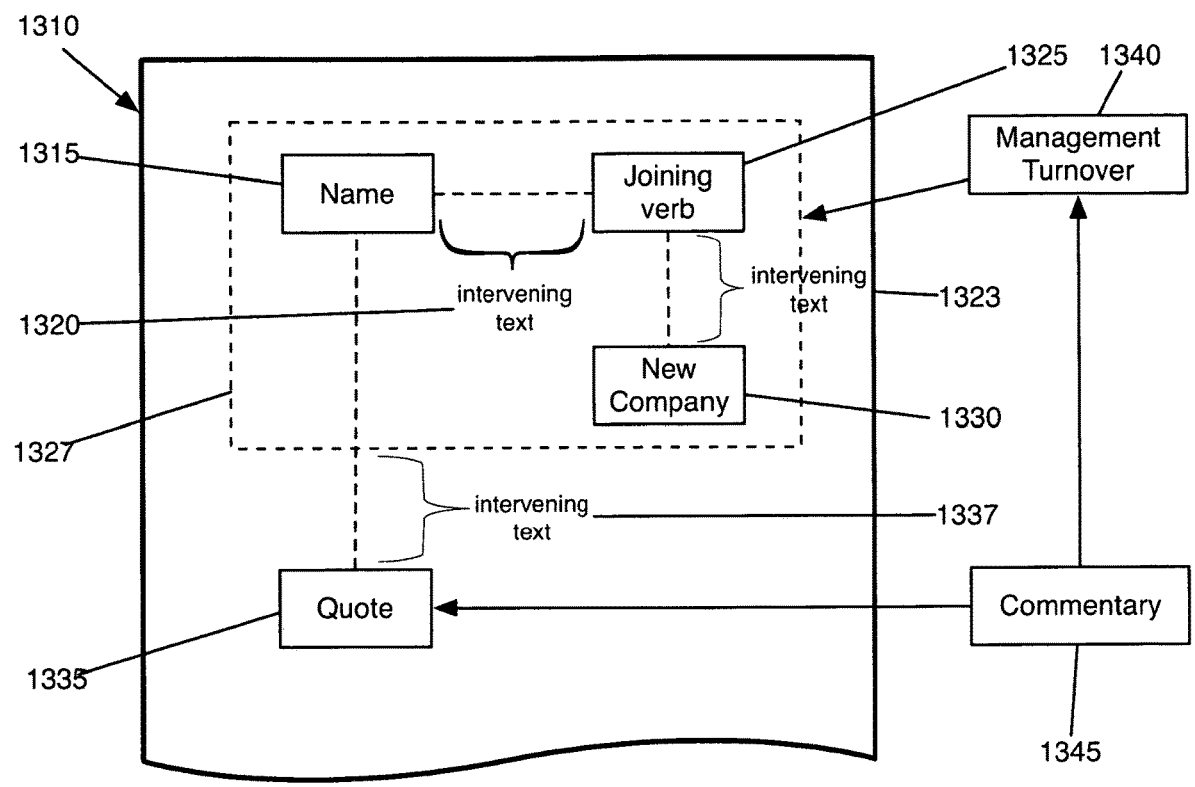
FIG. 13 conceptually illustrates an example pattern of attributing commentary to management turnover of some embodiments.

FIG. 13 conceptually illustrates an example pattern for indicating commentary about management turnover. In some embodiments, the fact-extraction process annotates a pattern to indicate commentary about the management turnover based on identifying a quote in document 1310. Document 1310 includes a pattern 1327 that is formed from a combination of elements 1315 (name), 1325 (joining verb), 1330 (company) and intervening texts 1320 and 1323. The pattern 1327 is annotated with a tag 1340 to indicate management turnover. In this example, the presence of element 1335 (quote) and intervening text 1337 to the elements and intervening text of pattern 1327 indicates commentary about the management turnover. The iterative fact-extraction process then annotates pattern 1327 with tag 1345 to indicate this commentary about management turnover in the document. In some embodiments, the process also attributes the name to the quote in document 1310 from the relationship (e.g., proximity) between element 1335 (quote) and any intervening text with element 1315 (name).

D. Product Initiative

In some embodiments, the iterative fact-extraction process identifies patterns indicating a product initiative for a particular company. This can be useful for tracking the introduction of new products of a particular company.

Figure 14A:
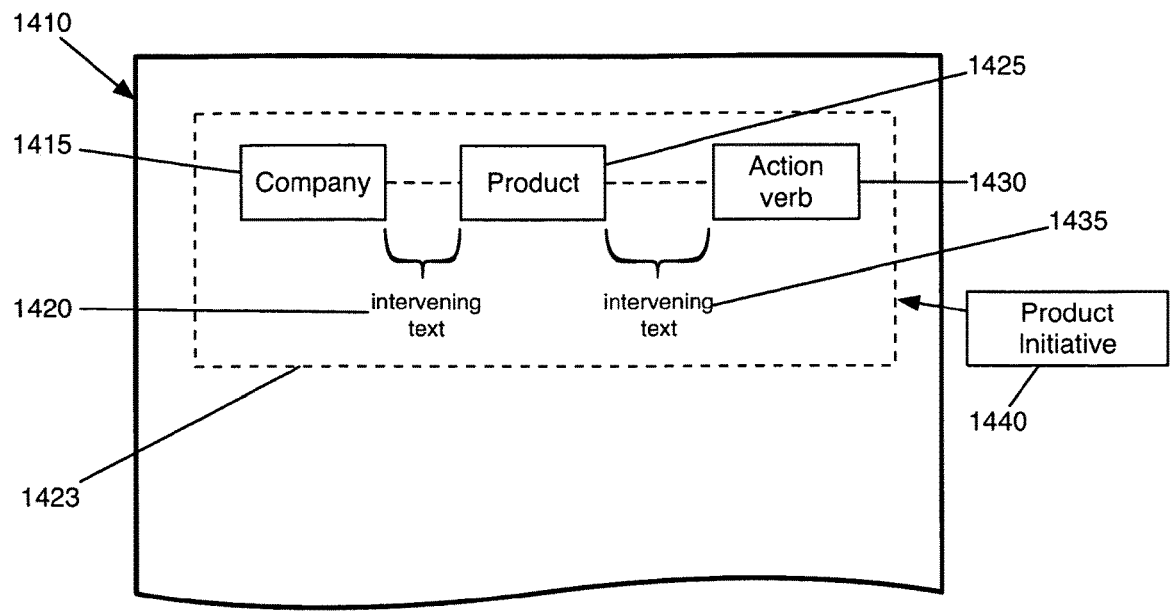
FIGS. 14(a)-(b) conceptually illustrate example patterns for product initiatives of some embodiments.
Figure 14B:
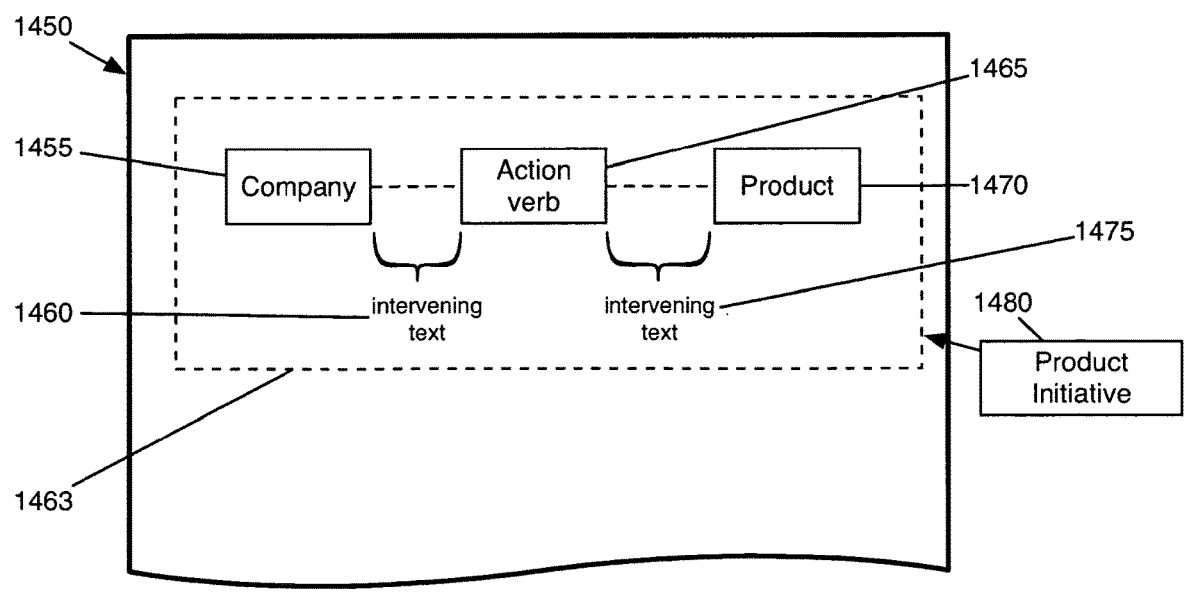

FIGS. 14(a)-(b) conceptually illustrate example patterns for product initiatives of some embodiments. FIG. 14(a) shows a document 1410 that includes a pattern 1423 formed from elements 1415 (company), 1425 (product), 1430 (action verb) and intervening texts 1420 and 1435. In some embodiments, element 1425 (product) is identified using a list including known words and expressions for products. Element 1430 is an action verb that may include, but not limited to, forms of the words "introduce," "sell," etc. The action verb, in some embodiments, is identified using a list including known words for action verbs. The iterative fact-extraction process then annotates the pattern 1423 with tag 1440 to indicate a product initiative in document 1410.

As shown in FIG. 14(b), similar to document 1410 described above, document 1450 also indicates a product initiative. Document 1450 includes a pattern 1463 formed from elements 1455 (company), 1465 (action verb), 1470 (product) and intervening texts 1460 and 1475. Document 1450 differs from document 1410 in that the positions of an identified action verb (element 1465) and identified product (element 1470) are transposed (e.g., swapped positions) in the document. In some embodiments, the iterative fact-extraction process annotates pattern 1463 with tag 1480 to indicate the product initiative.

E. Transactions

In some embodiments, the iterative fact-extraction process identifies patterns indicating a financial transaction. This can be useful for tracking specific types offerings for financial securities.

Figure 15A:
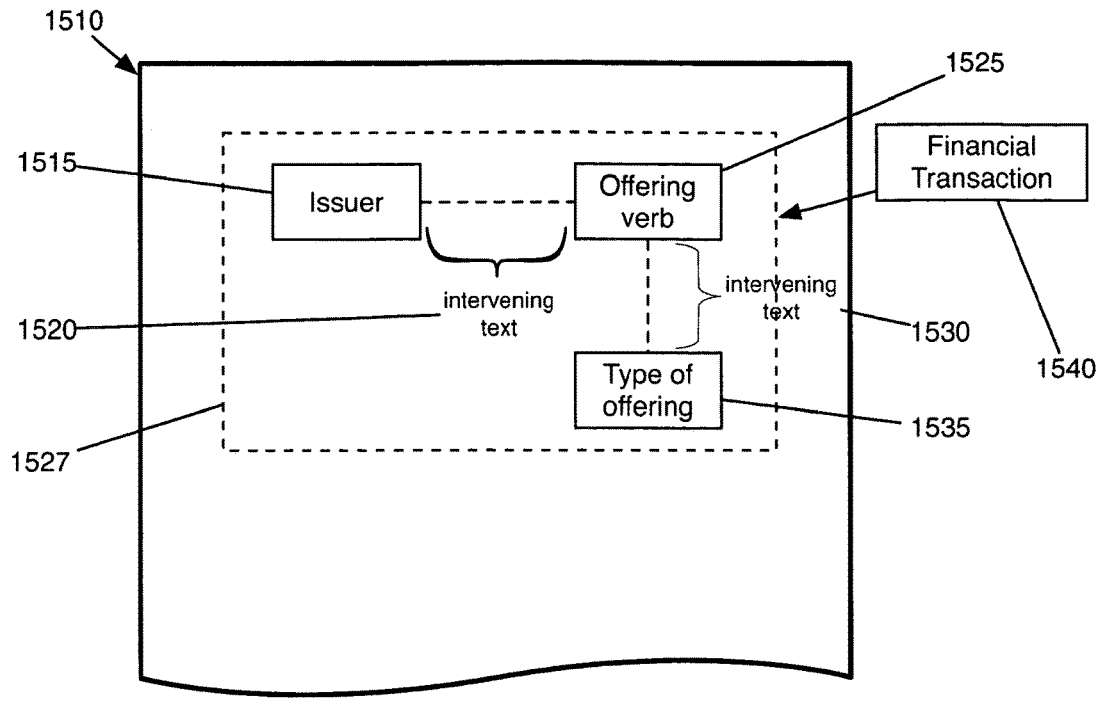
FIGS. 15(a)-(b) conceptually illustrate example patterns for financial transactions of some embodiments.
Figure 15B:
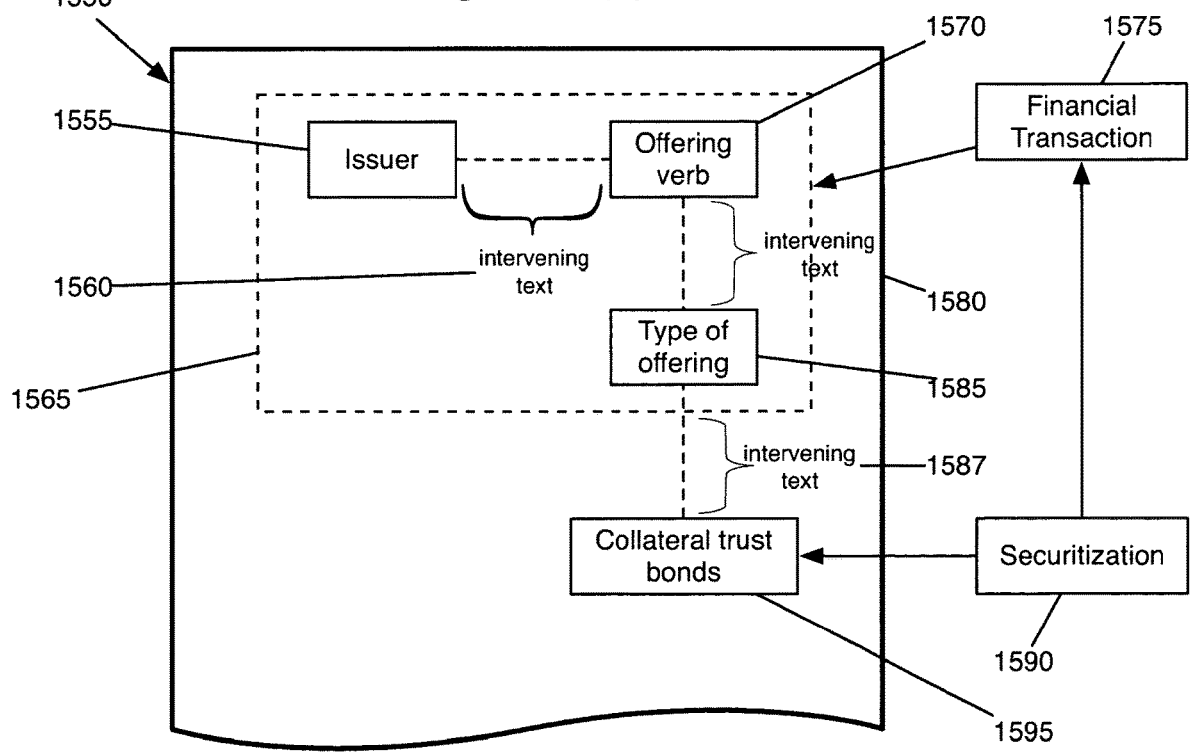

FIGS. 15(a)-(b) conceptually illustrate example patterns for financial transactions of some embodiments. In particular, bond offerings by a particular issuer are described in the following examples. As shown in FIG. 15(a), document 1510 includes a pattern 1527 formed from elements 1515 (issuer), 1525 (offering verb), 1535 (type of offering) and intervening texts 1520 and 1530. The iterative fact-extraction process identifies pattern 1527 to identify a financial transaction in the document. Element 1515 (issuer) indicates the issuer of a bond offering.

In some embodiments, the issuer is identified by a list including known words and expressions of issuers of financial securities such as bonds. The issuers included in such a list include known financial institutions and companies. Element 1525 is an "offering" verb that includes, but not is limited to, forms of the words "sell," "offer," "issue," etc. The offering verb is identified, in some embodiments, using a list including known words and expressions of offering verbs. Element 1535 is a type of offering. The type of offering may include, but is not limited to, forms of words and expressions for types of financial securities such as bonds, stocks, etc. In some embodiments, the type of offering is identified using a list including known words and expressions of types of financial offerings. In some embodiments, the iterative fact-extraction process annotates pattern 1527 with tag 1540 to indicate the financial transaction (e.g., a bond offering) in the document 1510.

As shown in FIG. 15(b), similar to document 1510 described above, document 1550 indicates a financial transaction. Document 1550 includes a pattern 1565 formed from elements 1555 (issuer), 1570 (offering verb), 1585 (type of offering) and intervening text 1560 and 1580. Document 1550 is annotated with tag 1575 to indicate a financial transaction. The iterative fact-extraction process then performs a subsequent level of pattern analysis to identify element 1595 that indicates an expression related to collateral trust bonds. Collateral trust bonds are a type of financial security that is secured by a financial asset (e.g., stocks or other bonds). In some embodiments, the collateral trust bonds are identified using a list including known words and expressions for collateral trust bonds or other types of bonds. The position of element 1595 and intervening text 1587 in relation to pattern 1565 indicates a securitization of the financial transaction in document 1550. In some embodiments, the iterative fact-extraction process annotates the pattern 1565 with tag 1590 to indicate the securitization of the financial transaction in the document 1550.

F. Tags Building on Other Tags

Figure 16:
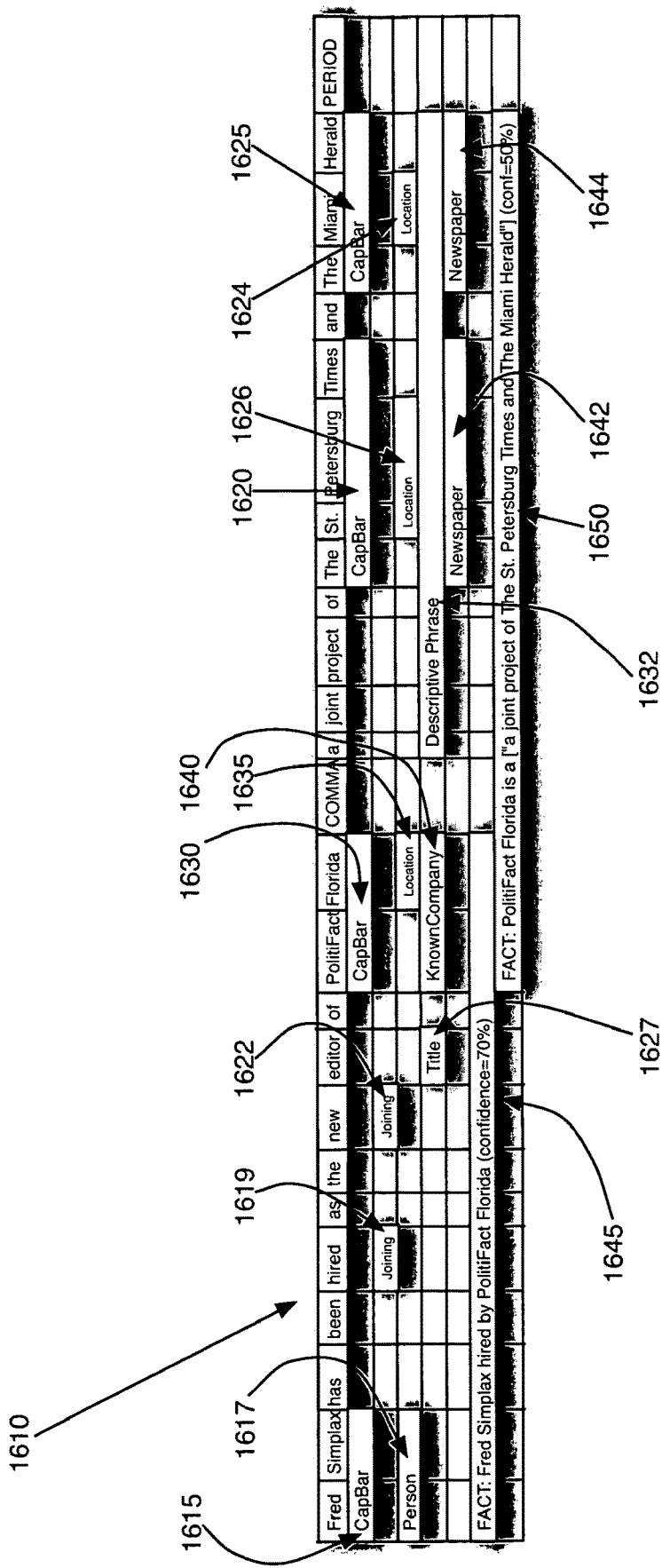
FIG. 16 conceptually illustrates one example of pattern analysis that extracts facts by having earlier stage tags build on later stage tags.

As mentioned above, the pattern analysis process of some embodiments identifies patterns of document elements and tags from tags that it identifies in the earlier stages. In other words, it can build tags upon previously defined tags. FIG. 16 conceptually illustrates one example of pattern analysis that extracts facts by having earlier stage tags build on later stage tags. In this example, facts are not directly extracted from the earlier stage tags. Instead, the earlier stage tags are only used to identify later stage "fact" tags that specify facts. In some embodiments, these fact tags might not be expressed in a manner that is optimized for subsequent querying or reporting. Accordingly, other embodiments convert these fact tags into a fact-specific format that is optimized for subsequent querying and reporting.

FIG. 16 illustrates a table 1610 that shows several levels of tags that are identified for a sentence in a document that states: Fred Simplax has been hired as the new editor of PolitiFact Florida, a joint project of The St. Petersburg Times and The Miami Herald. The table 1610, in some embodiments, can be a data structure for containing the respective tags and/facts from the different levels of pattern analysis. However, for other embodiments, this table does not correspond to a data structure used by these other embodiments, and instead only serves as a way of conceptualizing the analysis that is performed by these other embodiments.

The table 1610 includes rows that represent levels of pattern analysis in ascending order. The first row of the table 1610 includes a number of cells that each include one word that represents a token tag. In this example, each token tag is one recognized word in the analyzed sentence or a word that represents a punctuation in the sentence. After the first row, each of the subsequent rows of the table 1610 include one or more horizontal bars that span a particular number of token tags. Each horizontal bar represents a tag that was identified in a particular level of pattern analysis. While each of the rows of the table 1610 can be used to place horizontal tag bars in the example illustrated in FIG. 16, the columns of the table 1610 can be used to analyze the tags in order to identify relationships between the tags, as further described below.

In the example illustrated in FIG. 16, a tag in a row above another tag is a tag from an earlier stage of pattern analysis. However, in this example, tags that appear on each row were not necessarily identified in the same stage of the pattern analysis. In this example, tags from different levels of analysis might be placed on the same row in order to provide a condensed tabular representation of the analysis. In other words, each column of the table 1610 can be in different ascending scales. For example, a first column with different tags can represent levels 1-4 of pattern analysis while a second column with different tags can represent levels 1-7 of pattern analysis. However, one of ordinary skill will realize that in some embodiments, each row corresponds to one specific level of pattern analysis.

FIG. 16 illustrates that, after identifying the token tags in the first row, the pattern analysis process identifies several capitalized expression in the analyzed sentence and tags these capitalized expressions by CapBar tag 1615, 1620, 1625 and 1630. In some embodiments, CapBar tag annotates multi-word expressions that might serve as names. As shown in FIG. 16, the process then identifies the words "hired" and "new" as words that relate to a management turnover occurrence and thereby tags these words with Joining tags 1619 and 1622.

Next, the process identifies names of individuals and locations within the sentence and annotates these names with the Person tag 1617 and the Location tags 1624, 1626 and 1628. In some embodiments, the process is designed to assume that all names would be capitalized, and hence identifies these names by only searching within the regions of the documents covered by a CapBar tag, in order to achieve some efficiency in the document processing. In other embodiments, the process identifies these names independent of the CapBar tags.

After identifying the individuals and locations, the process (1) identifies the word "editor" with a Title tag 1627, (2) the name "PolitiFact Florida" with a KnownCompany tag 1640, and (3) the expression "a joint project of The St. Petersburg Times and The Miami Herald" with a DescriptivePhrase tag 1632. In some embodiments, the process identifies the title and company name by searching a list of job titles and a list of known companies. Also, in some embodiments, the process identifies the expression "a joint project . . . Herald" as a descriptive phrase based on a conditional relationship rule, such as "if a comma follows a known name, then the description following the comma until the subsequent punctuation is a descriptive phrase."

Next, the process identifies The St. Petersburg Times and The Miami Herald as names of Newspaper names and tags them accordingly with tags 1642 and 1644. The process then identifies a management turnover Fact tag 1645 by noting the relationship between the Person tag 1617, the Joining tags 1619 and 1622, and the KnownCompany tag 1640. This fact tag is expressed in terms of the person and company names identified by the Person and KnownCompany tags and the word that is tagged by the Joining tag.

Specifically, this fact tag is expressed as "Fred Simplax hired by PolitiFact Florida." This fact tag is also annotated with a confidence metadata, which reflects a confidence rating of 70%. This rating indicates a confidence level regarding the accuracy of the fact tag 1645. Such a rating is generated based on the pattern of document elements and/or tags that is used to generate the fact tag. Patterns that are more detailed and elaborate often have higher confidence scores associated with them in some embodiments than patterns that are simple and less elaborate. Reporting and query modules can subsequently use such ratings to determine which facts to report in response to a query or for a periodic electronic or print reporting.

Finally, the process identifies the fact tag 1650 based on the relationship of the previous management turnover fact tag 1645 and the other tags. For instance, in some embodiments, the fact tag 1650 is identified because the descriptive phrase tag 1632 follows a comma after the previous management turnover fact tag 1645 and it follows the name of the hiring company. The fact tag 1650 is thus identified in some embodiments as an elaboration on the hiring company. This fact tag 1650 is designated with a confidence rating of 50%. In some embodiments, this confidence rating is the confidence score of the pattern that led to the identification of the fact tag 1650.

IV. Manual Processing Tool

In some embodiments, the iterative fact-extraction process includes a pattern analysis process that performs pattern analysis of a document to identify patterns. For each iteration of fact-extraction, the process creates tags for any identified patterns from the document. However, the tags can be inaccurate. For example, the process may have failed to identify a pattern because an unexpected grammatical construction was used to represent the pattern in the document. In other cases, the process may have failed to identify a pattern because of an unrecognized or unexpected expression represented the fact (e.g., where a Spanish name is unrecognized as such). Other conditions in which the pattern analysis process or a subsequent fact-extraction process of some embodiments flags the document for manual processing were described above.

Accordingly, in some embodiments, the tags associated with the document can require manual processing by a human operator (i.e., user) because for an x number of documents that are processed by the iterative fact-extraction process, a certain percentage of the documents will require human intervention to modify the tags created by the iterative fact-extraction process.

Figure 17:
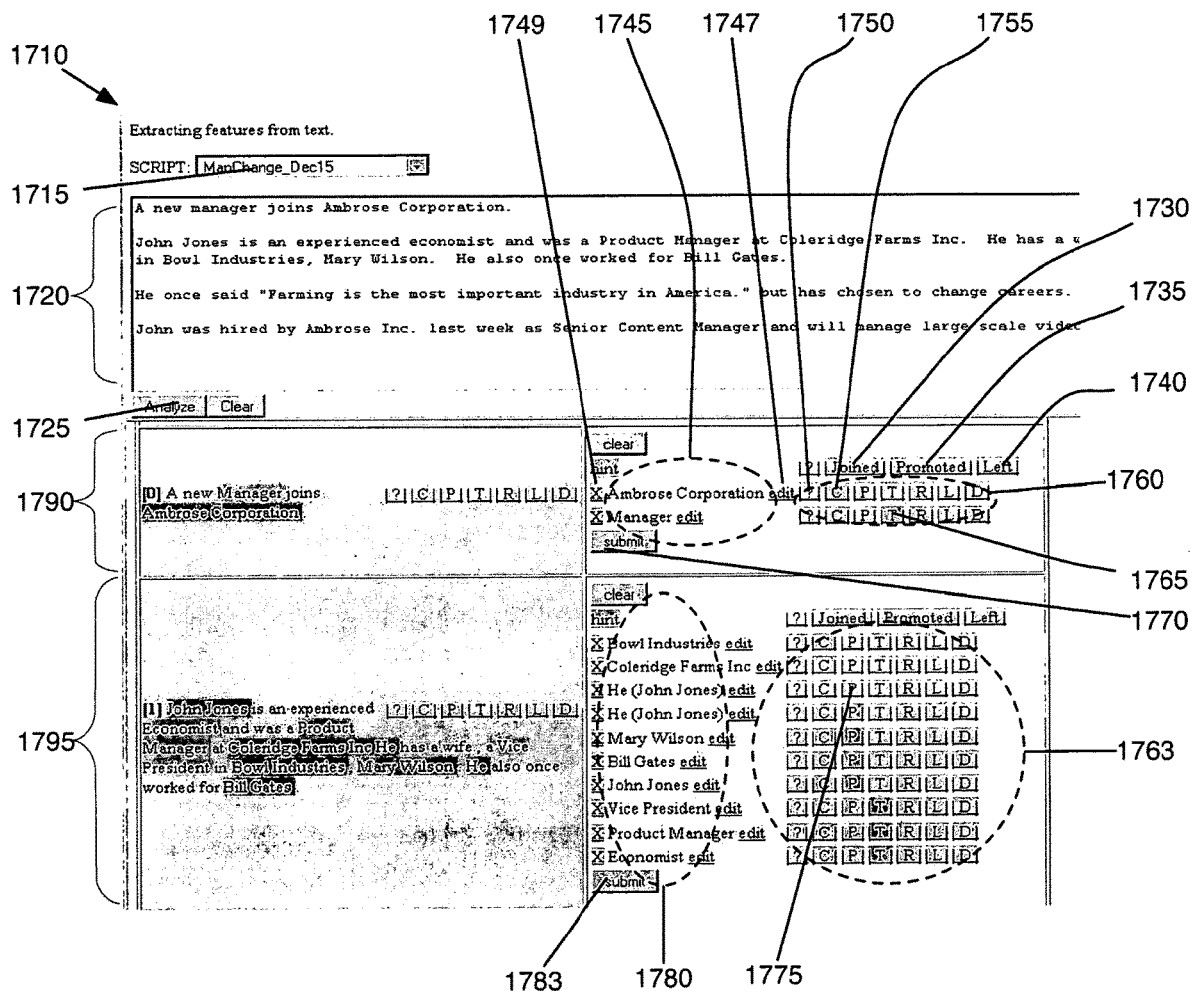
FIG. 17 illustrates an example graphical user interface (GUI) display for manually processing documents to adjust the results of iterative fact processing of some embodiments.

To assist in such modifications, some embodiments provide a tool for performing manual processing of documents. A human operator uses the tool to modify the associated tags of a particular document. FIG. 17 illustrates an example graphical user interface (GUI) display for manually processing documents to adjust the results of iterative fact processing of some embodiments. The GUI display 1710 shown in FIG. 17 may only show a portion of the GUI display 1710 of some embodiments. For example, in some cases the GUI display 1710 may include additional user interface elements that include additional functionalities and/or features that the user can select. Furthermore, in some embodiments, the illustrated GUI display 1710 can be part of a larger GUI display that has additional functional features.

The GUI display 1710 includes dropdown list UI item 1715, text box UI item 1720 and button 1725 ("analyze" button). GUI display 1710 includes dropdown list UI item 1715 to select a script for performing iterative fact-extraction on a particular document. The scripts displayed in dropdown list UI item 1715 can be user provided scripts (e.g., transferred from user clients) or scripts from local or remote storages (i.e., script files). Each script includes a particular set of pattern analysis instructions to identify patterns from a document. For example, respective scripts including specific pattern analysis instructions for identifying patterns for management turnover, just people, just words, just numbers, companies, or people and titles can be provided. In some embodiments, the pattern analysis instructions can define patterns from lists of known words and/or expressions. For example, the lists can include, but are not limited to, a list of locations, list of states, list of countries, list of cities, list of first names, list of male first names, list of female first names, list of verbs, list of titles, list of financial securities, list of companies, and a list of expressions. Accordingly, one example of a pattern analysis instruction defines a pattern that is formed from a first word in a first list, a second word in a second list and a third word that is a type of verb.

The user can then select a script from dropdown list UI item 1715 for executing a set of pattern analysis instructions from the selected script file on a particular document. GUI display 1710 includes text box UI item 1720 for presenting text data from a particular document. The document can be retrieved from local or remote storages or submitted by the user. In some embodiments, the user (i.e., the human operator) manually enters text data into text box UI item 1720 for processing. The user then selects button 1725 to run the selected script on the text data in text box UI item 1720. For each pattern analysis instruction from the script, the iterative fact-extraction process then performs iterative pattern analysis on the text data. For each level of pattern analysis, the iterative fact-extraction process creates tags for any identified patterns from the text data.

In some embodiments, GUI display 1710 presents the identified patterns in GUI display portions 1790 and 1795. In particular, the identified patterns from a first and a second paragraph of the text in text box UI item 1720 are respectively presented in GUI display portions 1790 and 1795. In some embodiments, GUI display 1710 provides respective GUI display portions for each paragraph in text box UI item 1720 to indicate identified patterns in various highlighted colors. For example, identified patterns in GUI display portions 1790 and 1795 are highlighted in different colors (e.g., red, yellow, green, etc.) in some embodiments to indicate different types of facts. Some examples of identified patterns include, but not limited to, companies, persons, titles, roles, locations, and numbers.

GUI display 1710 also presents respective identified patterns from the first and second paragraphs in GUI display portions 1745 and 1780. Each identified pattern is tagged (i.e., annotated) under a specific category after executing the script. As shown, identified patterns from the first paragraph are tagged as indicated by any one of UI items 1760. UI items 1760 include a set of respective UI items that indicate respective categories of tagged patterns tagged. For example, as shown, UI items 1760 represent the categories of companies ("C"), persons ("P"), titles ("T"), roles ("R"), locations ("L") and decimals ("D"). One of ordinary skill in the art would understand that UI items 1760 could include other categories of facts and be within the scope of the invention. As shown, facts from the first paragraph stating "Ambrose Corporation" and "Manager" are respectively tagged as a company ("C") and title ("T") with highlighted UI items 1755 and 1765. Moreover, the identified pattern stating "He (John Jones)" from the second paragraph is tagged as a person with highlighted UI item 1775 ("P"). For each identified pattern, GUI display 1710 indicates the tag for a particular identified pattern with a corresponding UI item similar to the previous description.

The user can then review the identified patterns and associated tags in GUI display 1710 to determine the accuracy of the pattern analysis performed by running the script. In some cases, the pattern analysis performed by the script identifies patterns formed from lists of known words and/or expressions as discussed above. Therefore, by viewing the displayed identified patterns and tags, the user can assess the accuracy of the pattern analysis by reviewing such lists to determine whether corresponding words and/or expressions from the analyzed text data were correctly identified as displayed in GUI display 1710.

In cases where the pattern analysis is inaccurate, the user (1) can modify a list of patterns (e.g., list of known words and/or expressions to add or remove words and/or expressions from the text data), or (2) to modify, add or delete a tag associated with a pattern. For example, the user can modify a list of known male names to include a name (e.g., a male Indian name such as "Hrithik Khan") from the text data that was not identified by the pattern analysis. After modifying the list, the user can re-execute the pattern analysis from the script by selecting button 1725. In some embodiments, the pattern analysis is only performed for respective levels of pattern analysis that are affected by the user modification (e.g., levels that are affected by the list(s) modified by the user). In a case where the pattern analysis identifies male Indian names during a third level of pattern analysis, the first and second levels pattern analysis are not performed to avoid repeating these levels of pattern analysis that are not affected by the user-modified list. In other words, for this example, the pattern analysis is performed starting from the third level of analysis and continues for each subsequent level until all remaining levels of pattern analysis are performed. In this fashion, the pattern analysis avoids rerunning each level of pattern analysis from the script.

After the pattern analysis has identified patterns and created associated tags, the user can review the results and modify the resulting patterns and tags. The GUI display 1710 provides particular UI items to modify the tags of identified patterns after executing the script. In some cases, the tag of an identified pattern can be designated under a wrong category. For an identified pattern from the first paragraph of text data, the user may select any of UI items 1760 to modify the tag. For example, the user may wish to modify an identified pattern "Charles Schwab" that is tagged as a person to instead be tagged as a company. In this example, the user may select one of the UI items 1760 corresponding to company ("C") to modify the tag. In some embodiments, the user may select submit button 1770 to apply the modifications to the identified pattern. Similarly, the user may select any of UI items 1763 to modify the tag for a particular identified pattern from the second paragraph and then apply the modification by selecting the corresponding submit button 1783. After selecting the corresponding submit button, in some embodiments, the iterative fact-extraction method flags the document and tag as being human validated. In some embodiments, the process updates the respective document and tag in storage.

In some embodiments, GUI display 1710 displays an identified pattern that is tagged but should not be tagged by any of the provided tags. This is another example of where the pattern analysis has erroneously identified an identified pattern in the document. In one particular case, for example, the user selects UI item 1750 ("?") to indicate that the identified pattern corresponding to "Ambrose Corporation" is an unrecognized or ambiguous fact and then selects submit button 1770 to apply this indication of the identified pattern being ambiguous. After selecting the corresponding submit button, in some embodiments, the iterative fact-extraction method flags the document and tag as being human validated. In some embodiments, the process updates the respective document and tag in storage after modification.

In some embodiments, GUI display 1710 provides a corresponding UI item for editing each identified pattern. For example, the user selects UI item 1747 ("edit") to edit the identified pattern for "Ambrose Corporation." The user then modifies "Ambrose Corporation" to instead state "Ambrose" or "Ambrose, Inc." The user then selects a corresponding submit button (i.e., submit button 1770) to apply the modification to the identified pattern. As shown, GUI display 1710 provides a corresponding UI item ("edit") to edit the text of each identified pattern (e.g., as shown for the identified patterns of the first and second paragraphs). The user then selects the corresponding submit button to apply the edits and to indicate the document and tag as being human validated. In some embodiments, the process updates the respective document and tag in storage after editing is finished.

In some embodiments, GUI display 1710 provides a particular UI item for removing an identified pattern and its associated tag. For example, the user removes an identified pattern and its associated tag by selecting a corresponding UI item in GUI display 1710. For example, the user selects UT item 1749 ("X") to remove the identified pattern for "Ambrose Corporation" and its tag as a company. The user then selects a corresponding submit button (i.e., submit button 1770) to apply the modification to the identified pattern and tag. Each identified pattern in GUI display 1710 is provided with a corresponding UI item to remove the identified pattern and corresponding tag. In some embodiments, the process updates the respective document and removes the corresponding tag in storage.

In some embodiments, GUI display 1710 provides UI items for further annotation of an identified pattern. GUI display 1710 provides UI items 1730 ("Joined"), 1735 ("Promoted") or 1740 ("Left") to allow the user to select several extracted tags and then annotate the selection with another tag. For example, for the facts extracted from the first paragraph, the user selects "Manager" and "Ambrose Corporation" from GUI display portion 1745 and then selects UI item 1730 ("Joined") to indicate that a manager has joined the company. To apply the modification, the user then selects corresponding submit button (i.e., submit button 1770). After selecting the corresponding submit button, in some embodiments, the process flags the document and tags as being human validated. In some embodiments, the process updates the respective document and stores the new tag in storage. In this manner, GUI display 1710 allows the user to provide additional facts that the script has not indicated.

V. Example GUI Output of Iterative Fact-Extraction

In some embodiments, a graphical user interface (GUI) display presents the facts from a document as indicated by the associated tags of the document. The GUI display can present facts related to management turnover, a product initiative, a financial transaction or any of the above described patterns of facts in documents. The following described figures illustrate some examples of respective GUI displays for presenting facts.

Figure 18:
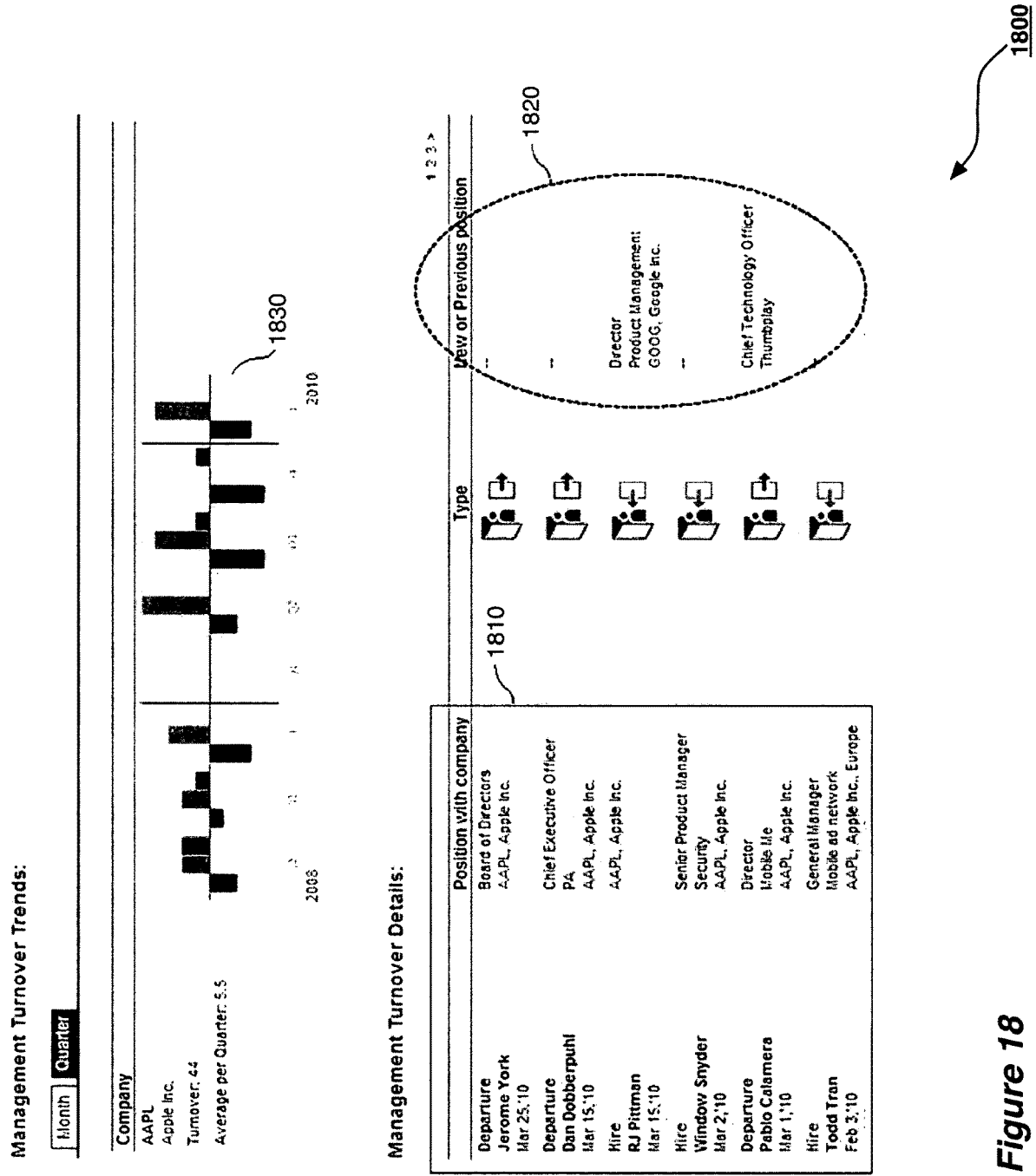
FIG. 18 illustrates an example of a GUI display for presenting management turnover for a particular company of some embodiments.

FIG. 18 illustrates an example of a graphical user interface (GUI) display for presenting management turnover for a particular company of some embodiments. GUI display 1800 includes GUI display portions 1810-1830 for presenting various facts for management turnover. In some embodiments, GUI display portion 1810 presents facts that indicate departures and hires of management personnel for a particular company. As shown in FIG. 18, the details of management turnover for Apple® are presented in the GUI display portion 1810 that presents the hires and departures of several management positions at Apple®. In GUI display portion 1820, facts indicating new or previous positions of respective management positions are presented. As shown, RJ Pittman was previously the director of product management at Google® before joining Apple®, and Pablo Calamera left Apple® to become the Chief Technology Office of Thumbplay®. In some embodiments, GUI display portion 1830 includes a timeline chart presenting the statistics of management turnover for a specified time period (e.g., quarterly, monthly, etc.). The presentation of extracted facts in GUI display portions 1810-1830 more easily allows a user to discern management turnover information in GUI display 1800.

Figure 19:
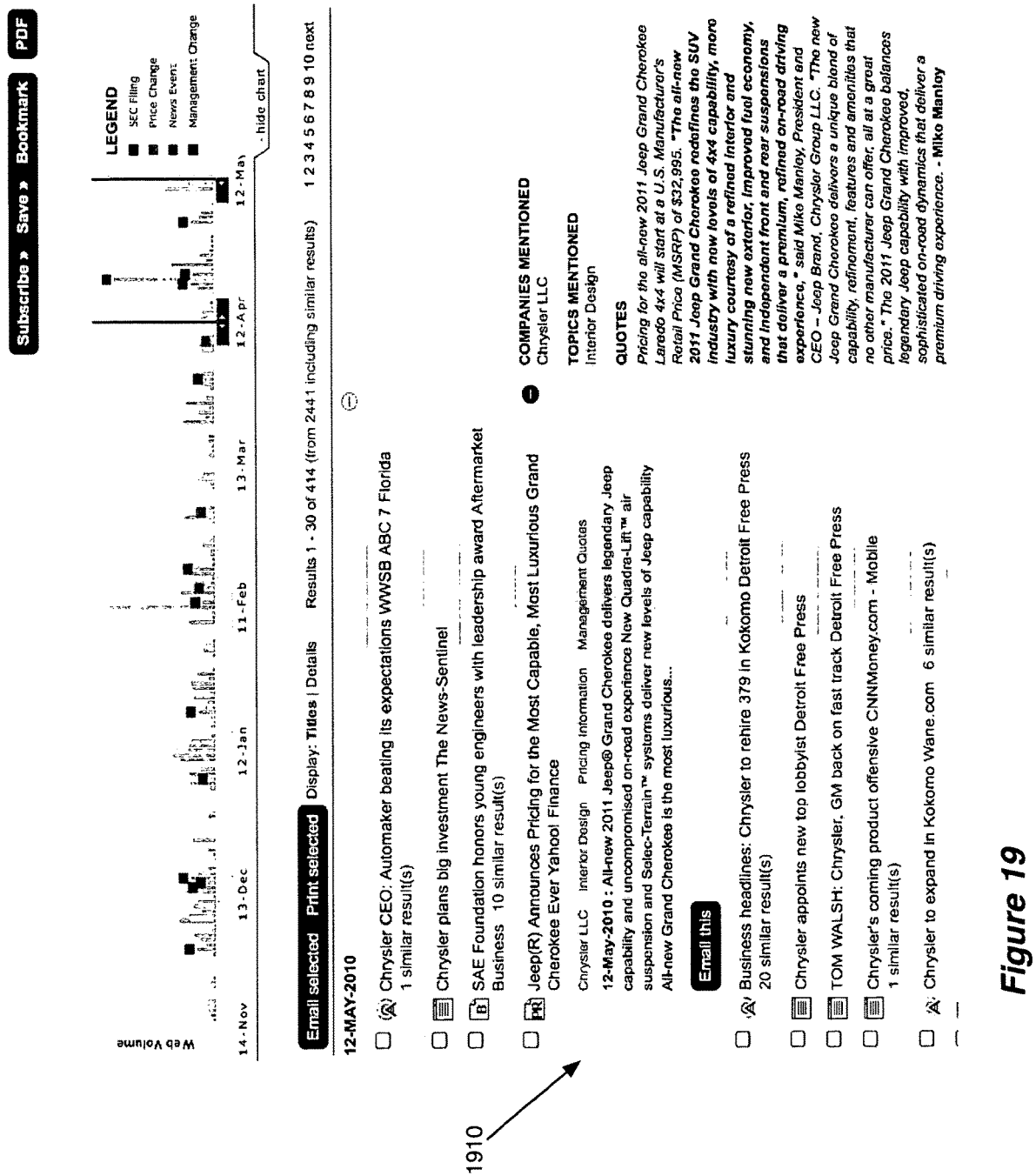
FIG. 19 illustrates an example of a GUI display for displaying a product initiative of some embodiments.

FIG. 19 illustrates an example of a GUI display for displaying a product initiative of some embodiments. GUI display 1900 includes GUI display portions 1910 and 1920 for presenting facts related to a product initiative for a particular company. GUI display 1910 includes facts that indicate a product initiative from a particular company. In some embodiments, facts indicating a product initiative from a particular document are presented in GUI display portion 1910. As shown, a product initiative related to Jeep® introducing a new Grand Cherokee vehicle is presented in GUI display portion 1910. In GUI display portion 1920, a quote related to the product initiative from the document is presented. In some embodiments, the quote is highlighted in bold to allow the user to more quickly discern information related to the product initiative. In this manner, relevant portions of the document are presented to the user without requiring the user to read the entire document.

Figure 20:
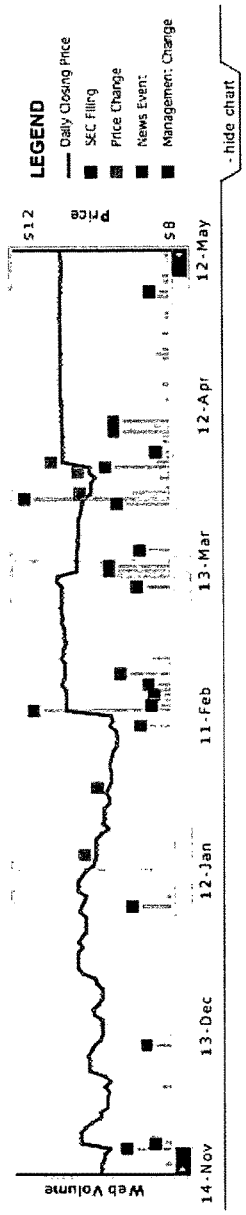
FIG. 20 illustrates an example of a graphical user interface output for displaying a financial transaction of some embodiments.

FIG. 20 illustrates an example of a graphical user interface output for displaying a financial transaction of some embodiments. GUI display 2000 includes GUI display portions 2010 and 2020 for presenting facts of a particular type of financial transaction. As shown in GUI display portion 2010, facts for a bond offering are presented. GUI display portion 2010 includes a highlighted (e.g., bolded) portion of a document that indicates a particular company (i.e., Skill-Soft PLC) may sell bonds (i.e., eight-year notes). In GUI display portion 2020, a quote related to the bond offering is presented. Moreover, GUI display portion 2020 includes a list of companies mentioned in the document and a list of topics covered in the document. This presentation of extracted facts in GUI display portions 2010 and 2020 allows the user to more easily gather pertinent information related to the bond offering.

VI. System Architecture

Figure 21:
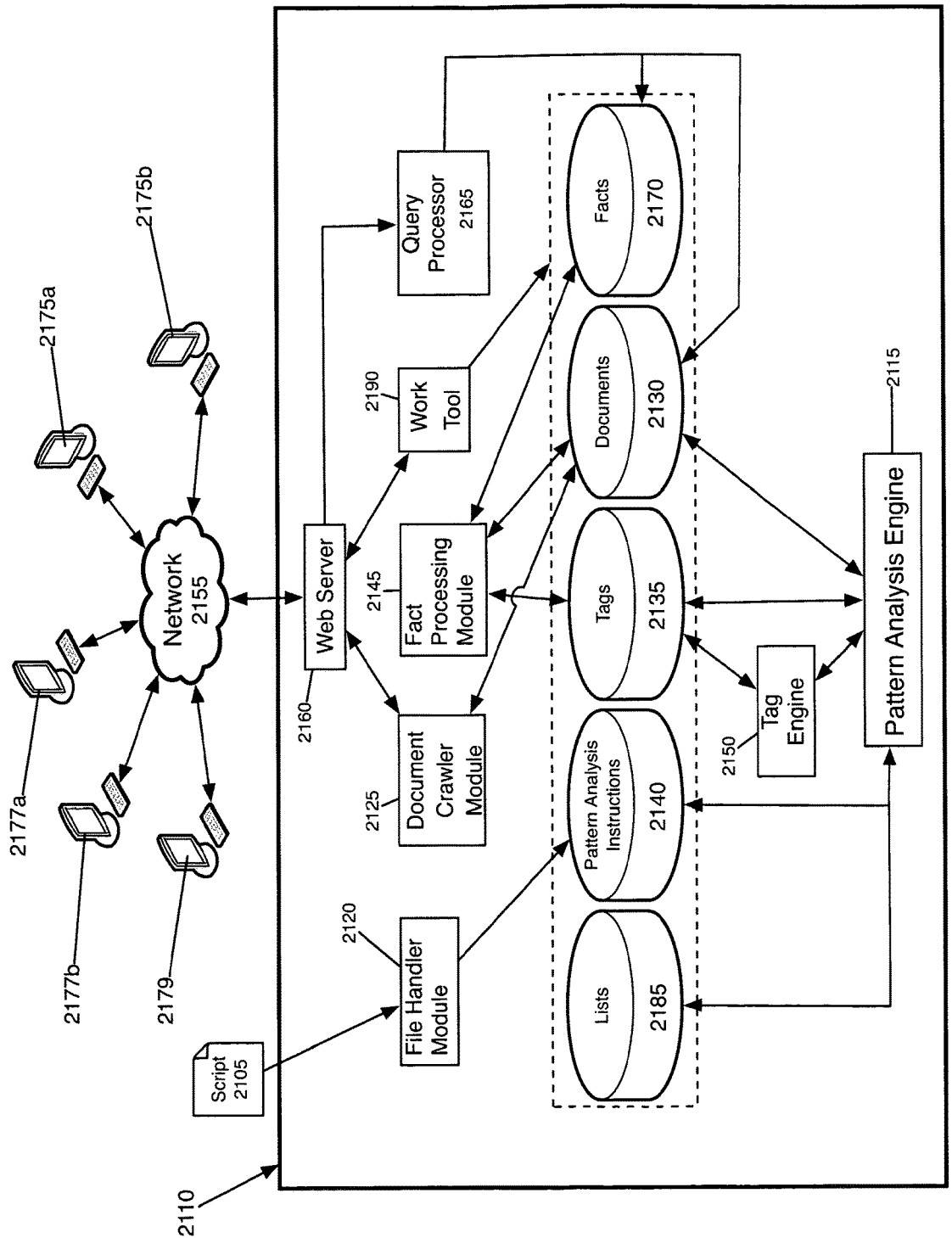
FIG. 21 conceptually illustrates an architecture block diagram of a system implements the iterative fact-extraction process of some embodiments.

FIG. 21 conceptually illustrates an architecture block diagram of a system 2110 that implements the iterative fact-extraction process of some embodiments of the invention. In addition to the iterative fact-extraction process, the system 2110 also retrieves documents from other computers connected to the system through a network. It further retrieves or identifies documents in response to queries received from other computers connected to the system through the network. In some embodiments, this system is implemented by several servers, each of which implements one or more components of the system.

As shown FIG. 21, the system 2110 includes a pattern analysis engine 2115, a file handler module 2120, a web crawler module 2125, a document storage 2130, a tag storage 2135, a pattern analysis instructions storage 2140, a fact processing module 2145, a tag engine 2150, a web server 2160, a query processor 2165, a fact storage 2170, a list storage 2185, and a work tool 2190.

The document crawler module 2125 communicates with a network 2155 to retrieve documents on a real-time or periodic basis. The document crawler 2125 can be any commercially used crawler, such as any known web crawler. In some embodiments, the network 2155 may be a local area network, a wide area network, a network of networks (e.g., the Internet), a wireless network, a mobile network, or any other type of communication network. The web crawler module 2125 then stores the retrieved documents on the document storage 2130.

The file handler module 2120 receives scripts 2105 that are embedded with pattern analysis instructions. In some embodiments, the file handler module 2120 can receive scripts from user computers 2177a and 2177b. The handler module 2120 then parses these scripts to extract the pattern analysis instructions, which it then stores in the pattern analysis instruction storage 2140. In some embodiments, the scripts 2105 are generated by a set of authors who identify different fact-extraction patterns that can be used to potentially identify and extract different facts from documents.

The pattern analysis engine 2115 retrieves the pattern analysis instructions from the pattern analysis instructions storage 2140, and then uses these instructions to analyze each document in multiple stages. In some embodiments, the pattern analysis engine 2115 performs for each retrieved document a multi-level fact-extraction process like the one described above in connection with FIGS. 1, 3 and 4. As described above, such a process iteratively executes different sets of pattern analysis instructions (where each set can include one or more pattern analysis instructions) to identify different levels of patterns. Accordingly, the pattern analysis engine 2115 iteratively performs the level 1 analysis $410_1$ through the level N analysis $410_N$ of FIG. 4 when it iteratively receives and executes the first instruction set 417 through the Nth instruction set 440. Moreover, the sets of pattern analysis instructions can define patterns from lists of known patterns (e.g., known words and/or expressions) that the pattern analysis engine 2115 can identify during the iterative pattern analysis. The list storage 2185 stores these lists of known words and/or expressions.

In executing the set of pattern analysis instructions, the pattern analysis engine 2115 uses the tag engine 2150 to annotate any identified patterns in the document with a respective tag. After tagging the patterns, the tag engine 2150 stores the identified tags in tags storage 2135. In some embodiments, the tag storage 2135 is a separate logical or physical storage than the document and instruction storages 2130 and 2140. However, in other embodiments, one or more of these storages are within the same logical or physical storages. Also, in some embodiments, the tags are stored within the documents (e.g., are embedded in the same file or other storage structure with the documents).

The fact processing module 2145 performs a post-processing operation on the tags stored in the tags storage 2135 and the documents stored on the documents storage 2130 to extract facts associated with the tags. One example of such post-processing operation was described above by reference to FIG. 5. After processing the tags, the fact processing module 2145 stores the facts on a facts storage 2170.

The work tool 2190 provides a tool for manually processing tags associated with documents stored on the documents storage 2130 and modifying the lists stored on the list storage 2185. One example of such a tool for manually processing tags and modifying lists was described above by reference to FIG. 17. One or more user computers 2179 can communicatively couple with the work tool 2190 (e.g., through the network 2155) in order to allow a user to manually process the tags associated with the documents. After processing the tags and/or modifying lists, the work tool 2190 updates the tags on tags storage 2135 and/or the lists on the list storage 2185. In some embodiments, the work tool can also modifies facts, pattern analysis instructions, and/or documents. Accordingly, FIG. 21 shows that the work tool 2190 can communicate with all the storages 2130, 2135, 2140, 2170 and 2185 (i.e., by showing that the arrow to and from the work tool terminates on the dashed box encircling these storages).

The query processor 2165 executes search queries on the facts stored on facts storage 2170 and the documents in documents storage 2130 to retrieve documents and/or facts that match search queries. The web server receives search queries from one or more user computers 2175 through the network 2155, and submits the search queries to the query processor 2165 for processing. The web server also returns search query results (i.e., the documents and/or facts) to the user computers through the network. The web server is also used to connect the document crawler 2125 and the work tool 2190 to the network 2155. However, one of ordinary skill will realize that the web server 2160 might not be so utilized in other embodiments. For instance, in some embodiments, the work tool 2190 operates on a computer on which the user that is using the tool directly operates.

The operation of the system 2110 will now be described for processing one document. Initially, the document crawler 2125 retrieves the document and stores the document in the document storage 2130. The pattern analysis engine 2115 later retrieves the document for processing. This engine performs a multi-level pattern analysis on the retrieved document, which results in a set of tags that are produced by the tag engine 2150 and that are stored in the tag storage 2135. The fact processing module 2145 later analyzes this set of tags in conjunction with the associated document, and produces a set of facts that are associated with these set of tags. This module then stores this set of facts in the fact storage 2170. The stored set of facts can later be queries along with the stored document when the query manager 2165 responds to a query from a user computer 2175. The work tool 2190 later receives requests from the user computer 2179 for manually processing the tags of the stored document. After processing the tags, the work tool then updates the tags stored in the tag storage 2135. The work tool 2190 also receives requests from the user computer 2179 for modifying the lists stored in the list storage 2185. The work tool updates the lists stored in the list storage 2185 responsive to these request.

Even though the system 2110 was described above to include several features some embodiments of the invention, one of ordinary skill will realize that this system can be implemented differently in other embodiments. For instance, in the system 2110, the pattern analysis engine 2115 generates tags that it stores in the tag storage 2135, while the fact processing module 2145 analyzes tags to generate facts that it stores in the fact storage 2170.

However, as mentioned above, some embodiments perform the pattern analysis and fact extraction as one process that is performed individually for each document. In some such embodiments, the tags that are identified in the earlier stages are only used to identify in later stages subsequent patterns and tags, which are then used to extract facts. Also, in some of these embodiments, the facts that are derived in the later stages are simply tags that are identified based on patterns that are detected from the earlier stage tags. Accordingly, in some of these embodiments, the later stage tags generated by pattern analysis engine 2115 express facts that can be reported, presented and/or queried. However, even in some of these other embodiments, some of these later stage tags are expressed in a manner that is optimized for subsequent querying or reporting. Accordingly, even in some of these embodiments, the system 2110 uses the fact processing module 2145 to convert some of later stage tags (which express a fact) into a fact-specific format that is optimized for subsequent querying and reporting.

Also, as illustrated in FIG. 21, the system 2110 performs fact-extraction processing along with document crawling and query management. However, in some embodiments, the system that performs the fact-extraction processing is not the same system that performs the document crawler or the query management. One such example would be a system that retrieves documents from a network and extracts facts from these documents, but instead of making the extracted searches available for queries, this system might produce electronic or physical reports or bulletin for distribution regarding the extracted facts.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
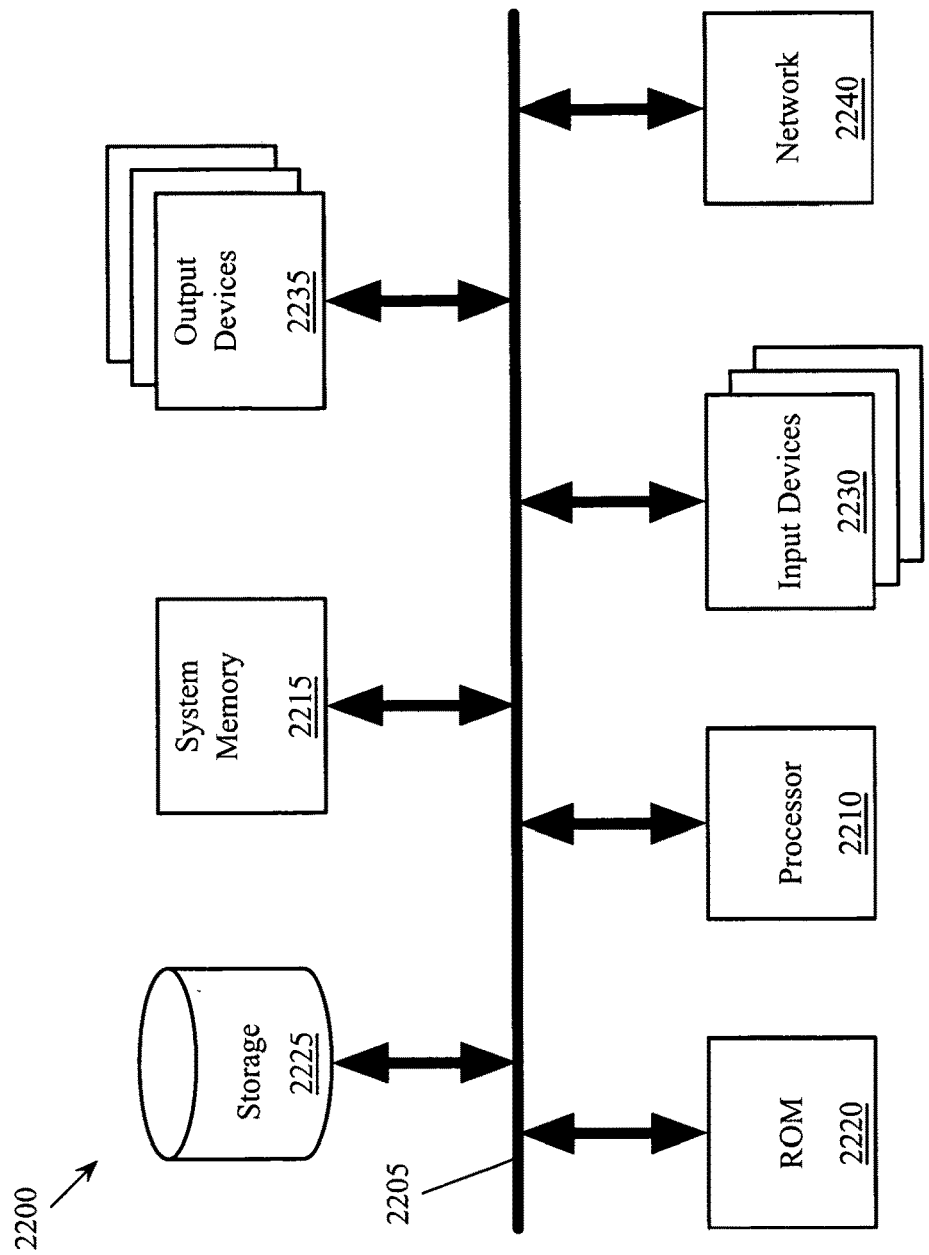
FIG. 22 conceptually illustrates an electronic system with which some embodiments are implemented.

FIG. 22 conceptually illustrates an electronic system 2200 with which some embodiments of the invention are implemented. The electronic system 2200 may be a computer, phone, PDA, or any other sort of electronic device. Such an electronic system includes various types of computer readable media and interfaces for various other types of computer readable media. Electronic system 2200 includes a bus 2205, processing unit(s) 2210, a system memory 2215, a read-only 2220, a permanent storage device 2225, input devices 2230, output devices 2235, and a network 2240.

The bus 2205 collectively represents all system, peripheral, and chipset buses that communicatively connect the numerous internal devices of the electronic system 2200. For instance, the bus 2205 communicatively connects the processing unit(s) 2210 with the read-only 2220, the system memory 2215, and the permanent storage device 2225.

From these various memory units, the processing unit(s) 2210 retrieves instructions to execute and data to process in order to execute the processes of the invention. The processing unit(s) may be a single processor or a multi-core processor in different embodiments.

The read-only-memory (ROM) 2220 stores static data and instructions that are needed by the processing unit(s) 2210 and other modules of the electronic system. The permanent storage device 2225, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2225.

Other embodiments use a removable storage device (such as a floppy disk, flash drive, or ZIP® disk, and its corresponding disk drive) as the permanent storage device 2225. Like the permanent storage device 2225, the system memory 2215 is a read-and-write memory device. However, unlike storage device 2225, the system memory 2215 is a volatile read-and-write memory, such a random access memory. The system memory 2215 stores some of the instructions and data that the processor needs at runtime. In some embodiments, the invention's processes are stored in the system memory 2215, the permanent storage device 2225, and/or the read-only 2220. For example, the various memory units include instructions for processing multimedia items in accordance with some embodiments. From these various memory units, the processing unit(s) 2210 retrieves instructions to execute and data to process in order to execute the processes of some embodiments.

The bus 2205 also connects to the input and output devices 2230 and 2235. The input devices enable the user to communicate information and select commands to the electronic system. The input devices 2230 include alphanumeric keyboards and pointing devices (also called "cursor control devices"). The output devices 2235 display images generated by the electronic system 2200. The output devices 2235 include printers and display devices, such as cathode ray tubes (CRT) or liquid crystal displays (LCD). Some embodiments include devices such as a touchscreen that functions as both input and output devices.

Finally, as shown in FIG. 22, bus 2205 also couples electronic system 2200 to a network 2240 through a network adapter (not shown). In this manner, the computer can be a part of a network of computers (such as a local area network ("LAN"), a wide area network ("WAN"), or an Intranet, or a network of networks, such as the Internet. Any or all components of electronic system 2200 may be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows may be performed by one or more programmable processors and by one or more programmable logic circuitry. General and special purpose computing devices and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A machine-implemented method for extracting a fact from a document, the document comprising a plurality of document elements, the method comprising:

identifying patterns, wherein the patterns are defined as an uninterrupted sequence of document elements, wherein identifying the patterns comprises:

displaying in a user interface a list of scripts in a dropdown list, wherein each script includes a particular set of pattern analysis instructions to identify the patterns from the document;

at a plurality of subsequent levels of a multi-level document analysis:

iteratively identifying patterns used to annotate a set of documents at levels of a multi-level document analysis to generate pattern supersets; and tagging the identified patterns with a tag, wherein the patterns are defined as an uninterrupted sequence of document elements and each tag has a tag type, wherein tagging the identified patterns with a tag comprises receiving a user selection of one or more of the scripts to execute a set of pattern analysis instructions that create tags for any identified patterns;

for each tag type, associating the tag type with one of the patterns identified in the iteration, wherein tagging each identified pattern comprises a multi-level process that includes:

based on the multi-level document analysis, extracting a set of facts based on the annotated set of documents, wherein the iteratively identifying additional patterns and tagging the identified patterns comprises:

at a first level of a multi-level document analysis: (a) identifying a set of patterns in the set of documents, (b) tagging the patterns with tags, and (c) associating each tag with a fact in at least one of the documents;

for the patterns and tags identifying:

(i) a first tag of a first tag type for a first pattern formed by a first set of document elements in the document, (ii) a second tag of a second tag type for a second pattern formed by a second set of document elements in the document, and (iii) a third tag of a third tag type for a third pattern formed by a third set of document elements in the document;

determining when the first tag is within a proximity of a first number X of words of the second set of document elements with the second tag, wherein X is an integer greater than zero;

when the first set of document elements of a pattern with the first tag has been determined to be within the determined first number of words of the second set of document elements with the second tag, identifying a fourth tag of a fourth tag type for a fourth pattern formed by the first tag and the second tag, wherein the fourth tag type is determined according to the first and second tag types;

based on the fourth tag, recording a first fact for the document;

determining when the third set of document elements is within a proximity of a second different number Y of words of the first and second sets of document elements, wherein Y is an integer greater than zero;

when the third set of document elements in the document has been determined to be within the determined second different number of words of the first and second sets of document elements, identifying a fifth tag of a fifth tag type for a fifth pattern formed by the third tag and the fourth tag, wherein the fifth tag type is determined according to the third and fourth tag types;

based on the fifth tag, recording a second fact for the document; and defining additional patterns, wherein a plurality of the additional patterns are formed from previously determined patterns to identify patterns of patterns, wherein each defined additional pattern includes two or more tagged patterns;

displaying a functional, graphical user interface that depicts the identified patterns and the tags and includes functionality to enable manual operations to process documents to adjust results of the tagging the identified patterns with a tag by execution of the scripts that create the tags for the identified patterns, wherein the functional, graphical user interface is capable of allowing manual operations comprising:

modification of a list of patterns; and modify a tag associated with a pattern;

upon receiving a search query from a user, executing the search query on the extracted set of facts to (i) identify a set of facts relating to the search query and extracted from a plurality of different documents and (ii) return documents from which the set of facts relating to the search query were extracted; and simultaneously displaying, in a display area, the returned documents and a plurality of the facts in the set of facts relating to the search query.

2. The method of claim 1, wherein the first pattern is defined by a list including known words and expressions.

3. The method of claim 1, wherein the fourth pattern is defined by a rule that further specifies a required relationship between the first and second tags and a fourth set of document elements.

4. The method of claim 1, wherein the first tag identifies the first pattern as a company, the second tag identifies the second pattern as an action verb, and the first fact is a new company hire.

5. The method of claim 4, wherein the third tag identifies the third set of document elements as a quote, the fourth tag identifies the fourth pattern as management turnover, and the fifth tag identifies the quote as commentary related to the management turnover.

6. The method of claim 1, wherein the first tag identifies the first pattern as a person, the second tag identifies the second pattern as a gender pronoun, and the fact is the person is male or female.

7. The method of claim 1 wherein extracting the set of facts based on the annotated set of documents comprises performing semantic analysis on the annotated set of documents to derive the set of facts.

8. The method of claim 7, wherein the set of facts are disclosed by the set of documents.

9. The method of claim 1, wherein identifying additional sets of patterns at a particular subsequent level of the multi-level document analysis is further based on sets of patterns identified at a plurality of previous levels of the multi-level document analysis.

10. The method of claim 1 further comprising storing the extracted set of facts in a storage.

* * * * *